(12) United States Patent
Geelen et al.

(10) Patent No.: US 8,600,668 B2
(45) Date of Patent: Dec. 3, 2013

(54) NAVIGATION DEVICE AND METHOD FOR DISPLAY OF POSITION IN TEXT READIBLE FORM

(75) Inventors: Pieter Geelen, Amsterdam (NL); Alexander Ribbink, Amsterdam (NL)

(73) Assignee: TomTom International B.V., Amsterdam (NL)

( * ) Notice: Subject to any disclaimer, the term of this patent is extended or adjusted under 35 U.S.C. 154(b) by 1397 days.

(21) Appl. No.: 11/907,241

(22) Filed: Oct. 10, 2007

(65) Prior Publication Data
US 2008/0167813 A1    Jul. 10, 2008

Related U.S. Application Data

(60) Provisional application No. 60/879,523, filed on Jan. 10, 2007, provisional application No. 60/879,549, filed on Jan. 10, 2007, provisional application No. 60/879,553, filed on Jan. 10, 2007, provisional application No. 60/879,577, filed on Jan. 10, 2007, provisional application No. 60/879,599, filed on Jan. 10, 2007, provisional application No. 60/879,529, filed on Jan. 10, 2007.

(51) Int. Cl.
*G01C 21/00*    (2006.01)

(52) U.S. Cl.
USPC .......................................... 701/440; 701/454

(58) Field of Classification Search
USPC ........... 455/457, 416, 417; 701/213, 440, 454
See application file for complete search history.

(56) References Cited

U.S. PATENT DOCUMENTS

| 6,208,934 | B1 | 3/2001 | Bechtolsheim et al. |
| 6,286,798 | B1 | 9/2001 | Chun |
| 6,850,188 | B1 * | 2/2005 | Lee et al. ................. 342/357.52 |
| 6,889,137 | B1 | 5/2005 | Rychlak |
| 7,031,728 | B2 * | 4/2006 | Beyer, Jr. ................... 455/456.3 |

(Continued)

FOREIGN PATENT DOCUMENTS

| JP | 4313786 A | 11/1992 |
| JP | 9054150 A | 2/1997 |
| JP | 2001194162 A | 7/2001 |
| JP | 2005300474 | 10/2005 |

OTHER PUBLICATIONS

US Office Action issued in co-pending U.S. Appl. No. 11/907,228, dated Sep. 9, 2010.

(Continued)

*Primary Examiner* — Mark Hellner

(57) ABSTRACT

A method and device are disclosed for navigation. In at least one embodiment, the method includes receiving a request for display of a location of a navigation device; determining at least one of a last known and a current GPS location of the navigation device; comparing the determined GPS location to stored map information and converting the determined GPS location into a text readable form; and displaying the text readable form of the determined GPS location on an integrated input and display of the navigation device. In at least one embodiment, the navigation device includes a processor to receive a request for display of a location of a navigation device, to determine at least one of a last known and a current GPS location of the navigation device, to compare the determined GPS location to stored map information and to convert the determined GPS location into a text readable form; and an integrated input and display device to display the text readable form of the determined GPS location.

48 Claims, 24 Drawing Sheets

(56) References Cited

U.S. PATENT DOCUMENTS

| | | | |
|---|---|---|---|
| 7,630,724 B2* | 12/2009 | Beyer et al. | 455/457 |
| 7,711,478 B2* | 5/2010 | Gluck | 701/208 |
| 2003/0182052 A1* | 9/2003 | DeLorme et al. | 701/201 |
| 2004/0150556 A1 | 8/2004 | Tucker | |
| 2005/0140676 A1 | 6/2005 | Cho | |
| 2006/0068808 A1 | 3/2006 | Karavias | |
| 2006/0199612 A1* | 9/2006 | Beyer et al. | 455/556.2 |
| 2006/0217883 A1 | 9/2006 | Nomura | |
| 2006/0250578 A1 | 11/2006 | Pohl et al. | |
| 2007/0174042 A1 | 7/2007 | Thompson | |
| 2008/0312824 A1* | 12/2008 | Jung | 701/208 |
| 2010/0175014 A1* | 7/2010 | Obradovich | 715/771 |
| 2010/0305847 A1* | 12/2010 | Gluck | 701/201 |

OTHER PUBLICATIONS

ISR for application PCT/EP2007/008744 received from the EPO Feb. 18, 2008.

* cited by examiner

NAVIGATION DEVICE AND METHOD FOR DISPLAY OF POSITION IN TEXT READIBLE FORM

PRIORITY STATEMENT

The present application hereby claims priority under 35 U.S.C. § 119(e) on each of U.S. Provisional Patent Application Nos. 60/879,523 filed Jan. 10, 2007, 60/879,549 filed Jan. 10, 2007, 60/879,553 filed Jan. 10, 2007, 60/879,577 filed Jan. 10, 2007, 60/879,599 filed Jan. 10, 2007, and 60/879,529 filed Jan. 10, 2007, the entire contents of each of which is hereby incorporated herein by reference.

CO-PENDING APPLICATIONS

The following applications are being filed concurrently with the present application. The entire contents of each of the following applications is hereby incorporated herein by reference: A NAVIGATION DEVICE AND METHOD FOR EARLY INSTRUCTION OUTPUT (U.S. application Ser. No. 11/907,229) filed on even date herewith; A NAVIGATION DEVICE AND METHOD FOR ESTABLISHING AND USING PROFILES (U.S. application Ser. No. 11/907,230) filed on even date herewith; A NAVIGATION DEVICE AND METHOD FOR ENHANCED MAP DISPLAY (U.S. application Ser. No. 11/907,231) filed on even date herewith; A NAVIGATION DEVICE AND METHOD RELATING TO AN AUDIBLE RECOGNITION MODE (U.S. application Ser. No. 11/907,232) filed on even date herewith; NAVIGATION DEVICE AND METHOD FOR PROVIDING POINTS OF INTEREST (U.S. application Ser. No. 11,907,233) filed on even date herewith; A NAVIGATION DEVICE AND METHOD FOR FUEL PRICING DISPLAY (U.S. application Ser. No. 11/907,234) filed on even date herewith; A NAVIGATION DEVICE AND METHOD FOR INFORMATIONAL SCREEN DISPLAY (U.S. application Ser. No. 11/907,235) filed on even date herewith; A NAVIGATION DEVICE AND METHOD FOR DEALING WITH LIMITED ACCESS ROADS (U.S. application Ser. No. 11/907,243) filed on even date herewith; A NAVIGATION DEVICE AND METHOD FOR TRAVEL WARNINGS (U.S. application Ser. No. 11/907,244) filed on even date herewith; A NAVIGATION DEVICE AND METHOD FOR DRIVING BREAK WARNING (U.S. application Ser. No. 11/907,227) filed on even date herewith; A NAVIGATION DEVICE AND METHOD FOR ISSUING WARNINGS (U.S. application Ser. No. 11/907,242) filed on even date herewith; A NAVIGATION DEVICE AND METHOD FOR EMERGENCY SERVICE ACCESS (U.S. application Ser. No. 11/907,228) filed on even date herewith; A NAVIGATION DEVICE AND METHOD FOR PROVIDING REGIONAL TRAVEL INFORMATION IN A NAVIGATION DEVICE (U.S. application Ser. No. 11/907,240) filed on even date herewith; A NAVIGATION DEVICE AND METHOD FOR USING SPECIAL CHARACTERS IN A NAVIGATION DEVICE (U.S. application Ser. No. 11/907,239) filed on even date herewith; A NAVIGATION DEVICE AND METHOD USING A PERSONAL AREA NETWORK (U.S. application Ser. No. 11/907,238) filed on even date herewith; A NAVIGATION DEVICE AND METHOD USING A LOCATION MESSAGE (U.S. application Ser. No. 11/907,237) filed on even date herewith; A NAVIGATION DECICE AND METHOD FOR CONSERVING POWER (U.S. application Ser. No. 11/907,236) filed on even date herewith; A NAVIGATION DEVICE AND METHOD FOR USING A TRAFFIC MESSAGE CHANNEL (U.S. application Ser. No. 11/907,253) filed on even date herewith; A NAVIGATION DEVICE AND METHOD FOR USING A TRAFFIC MESSAGE CHANNEL RESOURCE (U.S. application Ser. No. 11/907,252) filed on even date herewith; A NAVIGATION DEVICE AND METHOD FOR QUICK OPTION ACCESS (U.S. application Ser. No. 11/907,251) filed on even date herewith; A NAVIGATION DEVICE AND METHOD FOR DISPLAYING A RICH CONTENT DOCUMENT (U.S. application Ser. No. 11/907,257) filed on even date herewith.

FIELD

The present application generally relates to navigation methods and devices.

BACKGROUND

Navigation devices were traditionally utilized mainly in the areas of vehicle use, such as on cars, motorcycles, trucks, boats, etc. Alternatively, if such navigation devices were portable, they were further transferable between vehicles and/or useable outside the vehicle, for foot travel for example.

These devices are typically tailored to produce a route of travel based upon an initial position of the navigation device and a selected/input travel destination (end position), noting that the initial position could be entered into the device, but is traditionally calculated via GPS Positioning from a GPS receiver within the navigation device.

SUMMARY

The inventors discovered that while position can be determined by a GPS receiver within the navigation device, such a position is not easily recognizable by a user, especially in an emergency situation where a user may need to identify his/her location. Accordingly, the inventors developed a method to convey to a user, his/her position in text readable (readable text) form.

In at least one embodiment of the present application, a method includes receiving a request for display of a location of a navigation device; determining at least one of a last known and a current GPS location of the navigation device; comparing the determined GPS location to stored map information and converting the determined GPS location into a text readable form; and displaying the text readable form of the determined GPS location on an integrated input and display of the navigation device. The comparing comprises determining at least one element of map information associated with the determined GPS location. The description comprises readable text information corresponding to one or more said determined element of map information and readable text information indicating the relative location of the determined GPS location to said one or more said determined element of map information.

In at least one embodiment of the present application, a navigation device includes a processor to receive a request for display of a location of a navigation device, to determine at least one of a last known and a current GPS location of the navigation device, to compare the determined GPS location to stored map information and to convert the determined GPS location into a text readable form; and an integrated input and display device to display the text readable form of the determined GPS location. In various implementations of the method and device, the converting may comprise following a plurality of pre-programmed rules comprising determining a format of the description from a plurality of formats. The rules may include selecting between a precise location and an approximate location. The rules may comprise selecting a format referencing a location relative to a single said determined element versus two said determined elements. The rules may include selecting between referencing a POI as said at least one element and an intersection as said at least one element. The rules may comprise selecting between forming the description in the present tense versus the past tense. The rules may comprise selecting between referencing a street address versus a POI or intersection. The readable text information may be displayed responsive to an emergency call. The description may comprise both a street location and a location relative to a POI and the displaying may comprise displaying these sequentially. The displaying may be in addition to a labeled map. The displaying may be simultaneously with an emergency services telephone icon. The description may persist during an emergency call made using the icon.

BRIEF DESCRIPTION OF THE DRAWINGS

The present application will be described in more detail below by using example embodiments, which will be explained with the aid of the drawings, in which.

DETAILED DESCRIPTION OF THE EXAMPLE EMBODIMENTS

Figure 1:
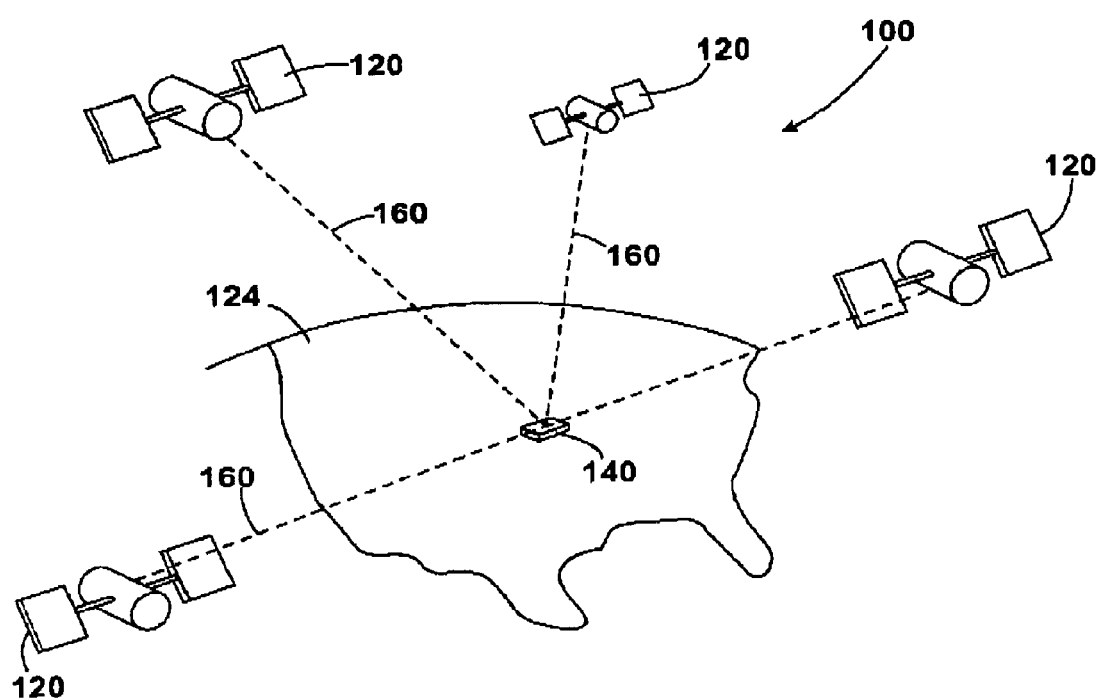
FIG. 1 illustrates an example view of a Global Positioning System (GPS)

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the term "and/or" includes any and all combinations of one or more of the associated listed items.

FIG. 1 illustrates an example view of Global Positioning System (GPS), usable by navigation devices, including the navigation device of embodiments of the present application. Such systems are known and are used for a variety of purposes. In general, GPS is a satellite-radio based navigation system capable of determining continuous position, velocity, time, and in some instances direction information for an unlimited number of users.

Formerly known as NAVSTAR, the GPS incorporates a plurality of satellites which work with the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140, usable in embodiments of navigation devices of the present application, is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
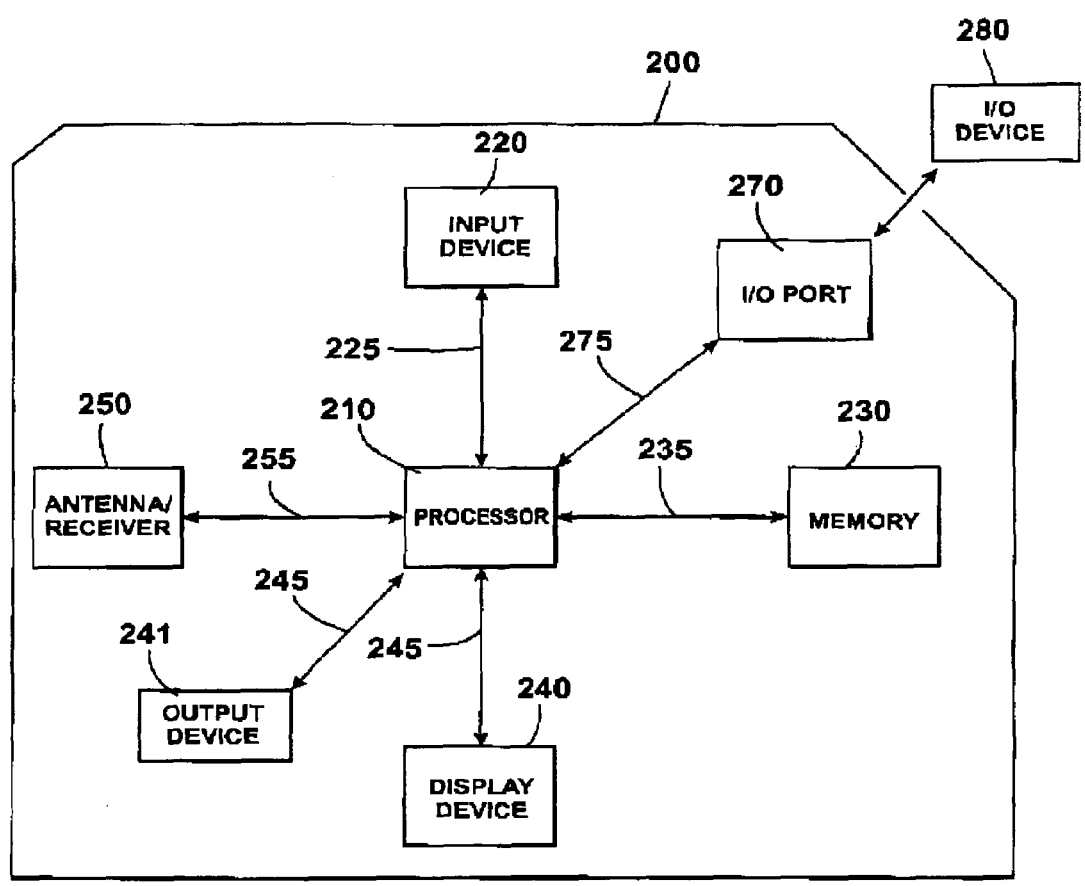
FIG. 2 illustrates an example block diagram of electronic components of a navigation device of an embodiment of the present application.

FIG. 2 illustrates an example block diagram of electronic components of a navigation device 200 of an embodiment of the present application, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilized to input information; and the display screen 240 can include any type of display screen such as an LCD display, for example. In at least one embodiment of the present application, the input device 220 and display screen 240 are integrated into an integrated input and display device, including a touchpad or touchscreen input wherein a user need only touch a portion of the display screen 240 to select one of a plurality of display choices or to activate one of a plurality of virtual buttons.

In addition, other types of output devices 250 can also include, including but not limited to, an audible output device. As output device 241 can produce audible information to a user of the navigation device 200, it is equally understood that input device 240 can also include a microphone and software for receiving input voice commands as well.

In the navigation device 200, processor 210 is operatively connected to and set to receive input information from input device 240 via a connection 225, and operatively connected to at least one of display screen 240 and output device 241, via output connections 245, to output information thereto. Further, the processor 210 is operatively connected to memory 230 via connection 235 and is further adapted to receive/send information from/to input/output (I/O) ports 270 via connection 275, wherein the I/O port 270 is connectible to an I/O device 280 external to the navigation device 200. The external I/O device 270 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

The navigation device 200, in at least one embodiment, may establish a "mobile" network connection with the server 302 via a mobile device 400 (such as a mobile phone, PDA, and/or any device with mobile phone technology) establishing a digital connection (such as a digital connection via known Bluetooth technology for example). Thereafter, through its network service provider, the mobile device 400 can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device 400 (via a service provider) and another device such as the server 302, using the internet 410 for example, can be done in a known manner. This can include use of TCP/IP layered protocol for example. The mobile device 400 can utilize any number of communication standards such as CDMA, GSM, WAN, etc.

As such, an internet connection may be utilized which is achieved via data connection, via a mobile phone or mobile phone technology within the navigation device 200 for example: For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet.

The navigation device 200 can further complete a data connection with the mobile device 400, and eventually with the internet 410 and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, wherein the internal antenna of the navigation device 200 can further alternatively be used). The mobile phone technology within the navigation device 200 can include internal components as specified above, and/or can include an insertable card, complete with necessary mobile phone technology and/or an antenna for example. As such, mobile phone technology within the navigation device 200 can similarly establish a network connection between the navigation device 200 and the server 302, via the internet 410 for example, in a manner similar to that of any mobile device 400.

For GRPS phone settings, the Bluetooth enabled device may be used to correctly work with the ever changing spectrum of mobile phone models, manufacturers, etc., model/manufacturer specific settings may be stored on the navigation device 200 for example. The data stored for this information can be updated in a manner discussed in any of the embodiments, previous and subsequent.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered within the scope of the present application. For example, in one embodiment, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a motorized vehicle such as a car or boat for example. Such a navigation device 200 is then removable from the docked location for portable or handheld navigation use.

Figure 3:
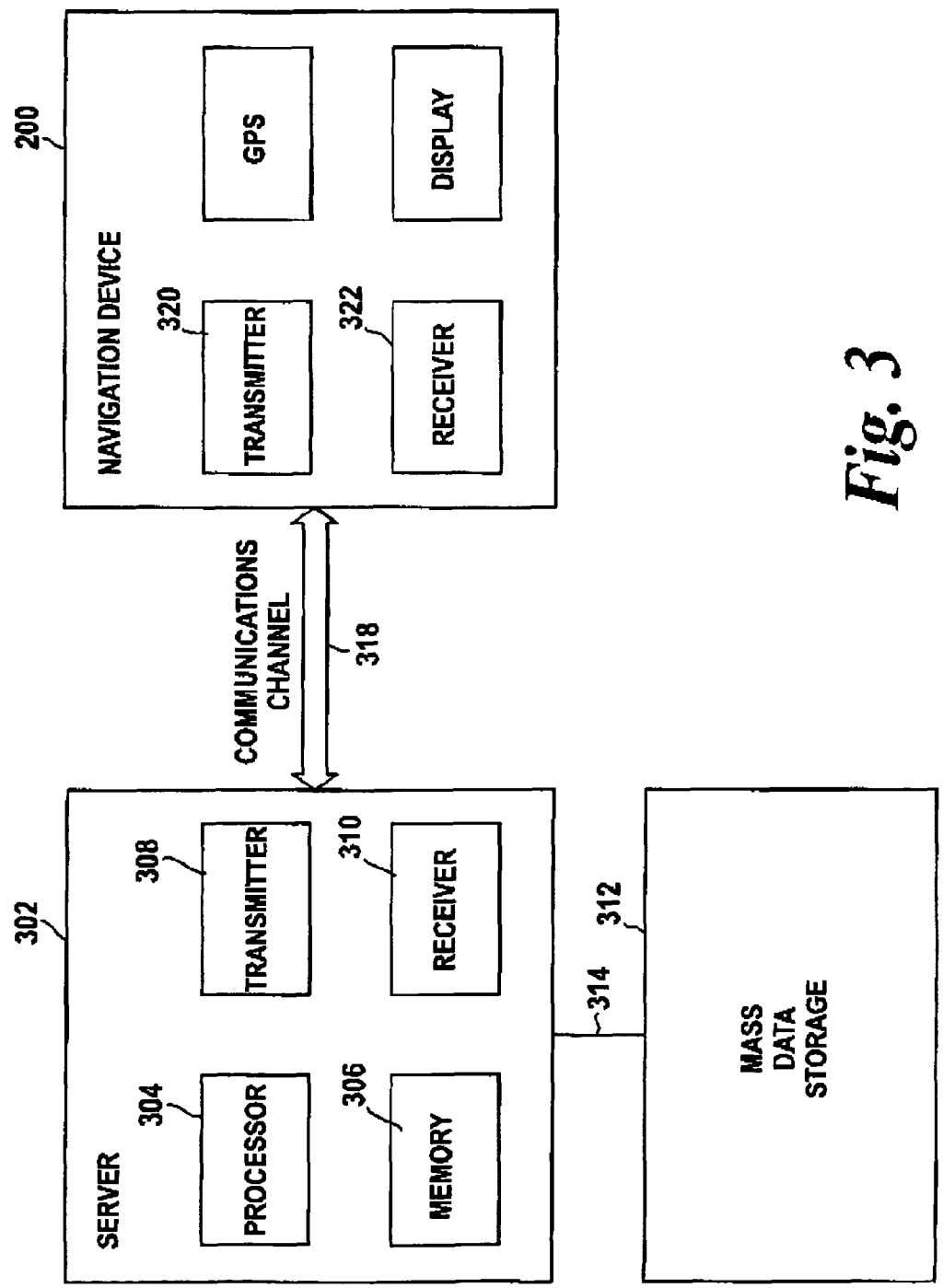
FIG. 3 illustrates an example block diagram of a server, navigation device and connection therebetween of an embodiment of the present application.

FIG. 3 illustrates an example block diagram of a server 302 and a navigation device 200 of the present application, via a generic communications channel 318, of an embodiment of the present application. The server 302 and a navigation device 200 of the present application can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. According to at least one embodiment of the present application, another service provided by the server 302 includes processing the navigation data using various algorithms for a desired application and sending the results of these calculations to the navigation device 200.

The communication channel 318 generically represents the propagating medium or path that connects the navigation device 200 and the server 302. According to at least one embodiment of the present application, both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, according to at least one embodiment, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fiber optic cables, converters, radio-frequency (rf) waves, the atmosphere, empty space, etc. Furthermore, according to at least one various embodiment, the communication channel 318 can include intermediate devices such as routers, repeaters, buffers, transmitters, and receivers, for example.

In at least one embodiment of the present application, for example, the communication channel 318 includes telephone and computer networks. Furthermore, in at least one embodiment, the communication channel 318 may be capable of accommodating wireless communication such as radio frequency, microwave frequency, infrared communication, etc. Additionally, according to at least one embodiment, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. According to at least one embodiment, these signals may be modulated, encrypted and/or compressed signals as may be desirable for the communication technology.

The mass data storage 312 includes sufficient memory for the desired navigation applications. Examples of the mass data storage 312 may include magnetic data storage media such as hard drives for example, optical storage media such as CD-Roms for example, charged data storage media such as flash memory for example, molecular memory, etc.

According to at least one embodiment of the present application, the server 302 includes a remote server accessible by the navigation device 200 via a wireless channel. According to at least one other embodiment of the application, the server 302 may include a network server located on a local area network (LAN), wide area network (WAN), virtual private network (VPN), etc.

According to at least one embodiment of the present application, the server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

The mass storage device 312 connected to the server 302 can include volumes more cartographic and route data than that which is able to be maintained on the navigation device 200 itself, including maps, etc. The server 302 may process, for example, the majority of the devices of a navigation device 200 which travel along the route using a set of processing algorithms. Further, the cartographic and route data stored in memory 312 can operate on signals (e.g. GPS signals), originally received by the navigation device 200.

As indicated above in FIG. 2 of the application, a navigation device 200 of an embodiment of the present application includes a processor 210, an input device 220, and a display screen 240. In at least one embodiment, the input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4A:
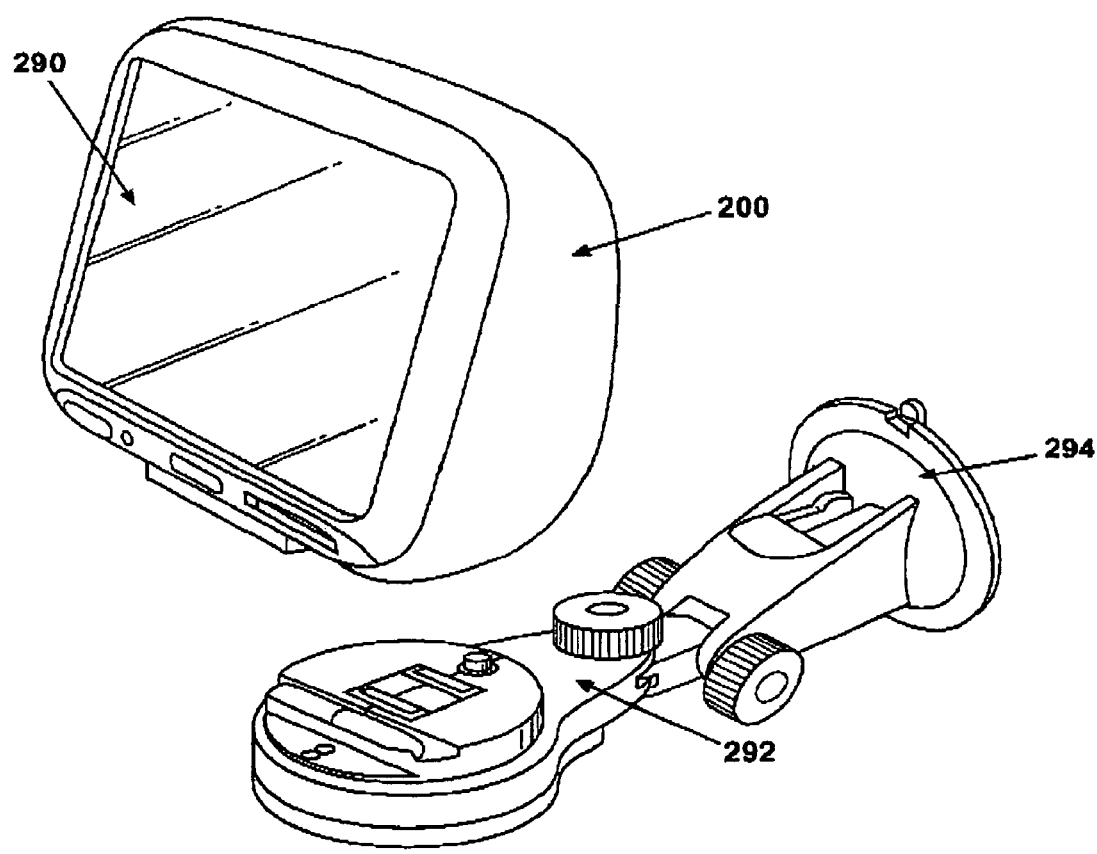
FIGS. 4A and 4B are perspective views of an actual implementation of an embodiment of the navigation device 200.
Figure 4B:
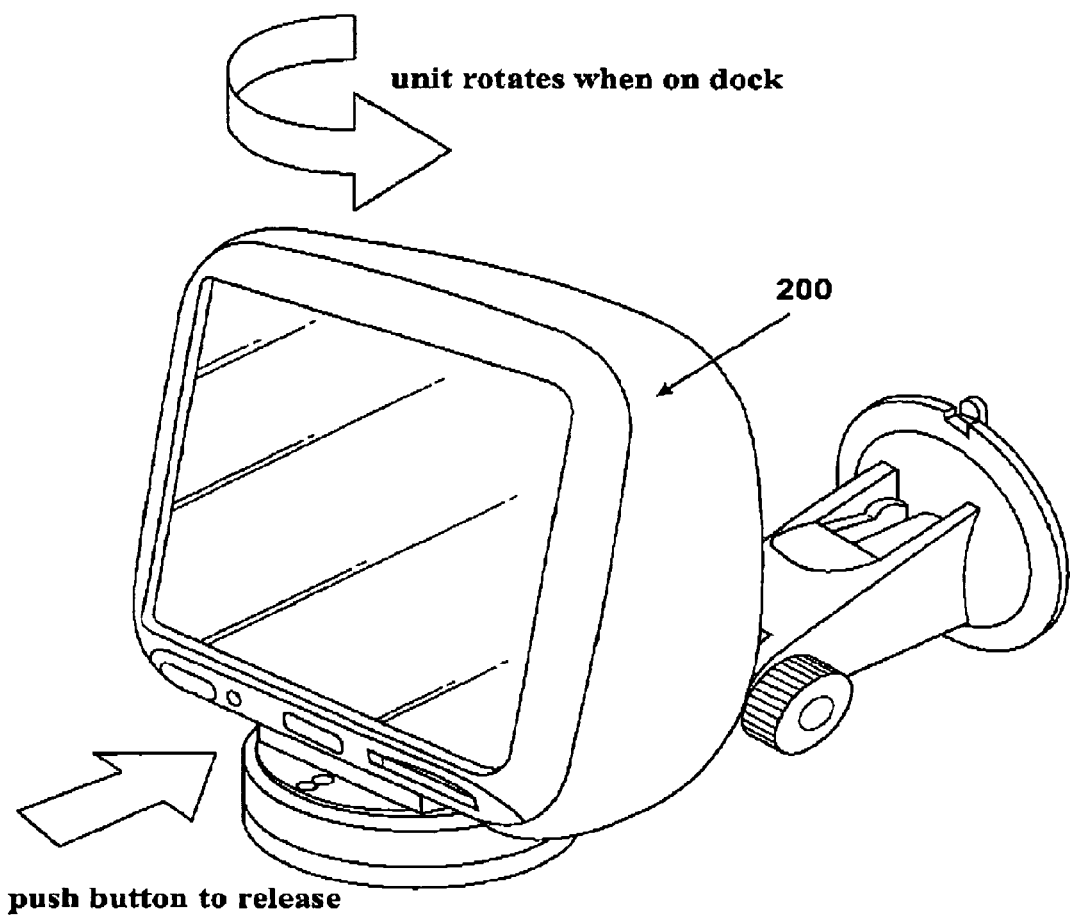

FIGS. 4A and 4B are perspective views of an implementation of an embodiment of the navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 220, etc.).

The navigation device 200 may sit on an arm 292, which itself may be secured to a vehicle dashboard/window/etc. using a large suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example (this is only one example, as other known alternatives for connection to a docking station are within the scope of the present application). The navigation device 200 may then be rotatable on the arm 292, as shown by the arrow of FIG. 4B. To release the connection between the navigation device 200 and the docking station, a button on the navigation device 200 may be pressed, for example (this is only one example, as other known alternatives for disconnection to a docking station are within the scope of the present application).

Figure 5:
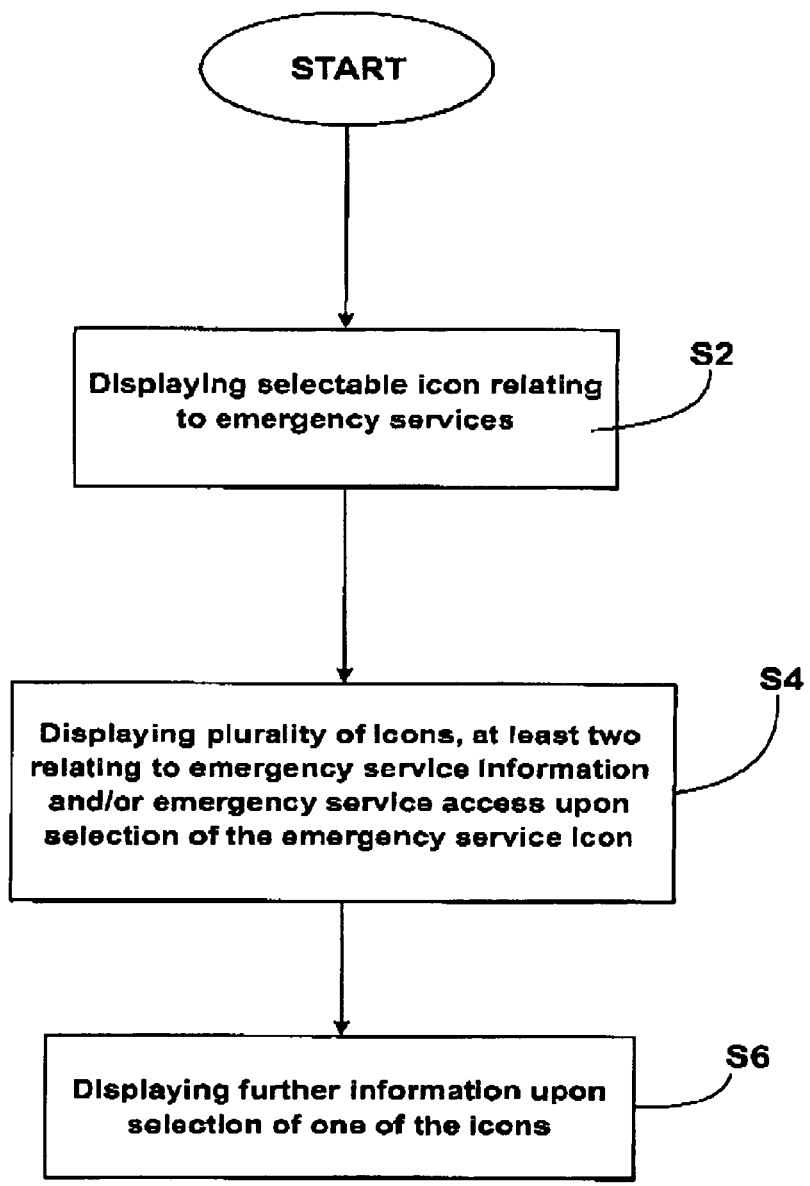
FIG. 5 illustrates an example of an embodiment of the present application.
Figure 6:
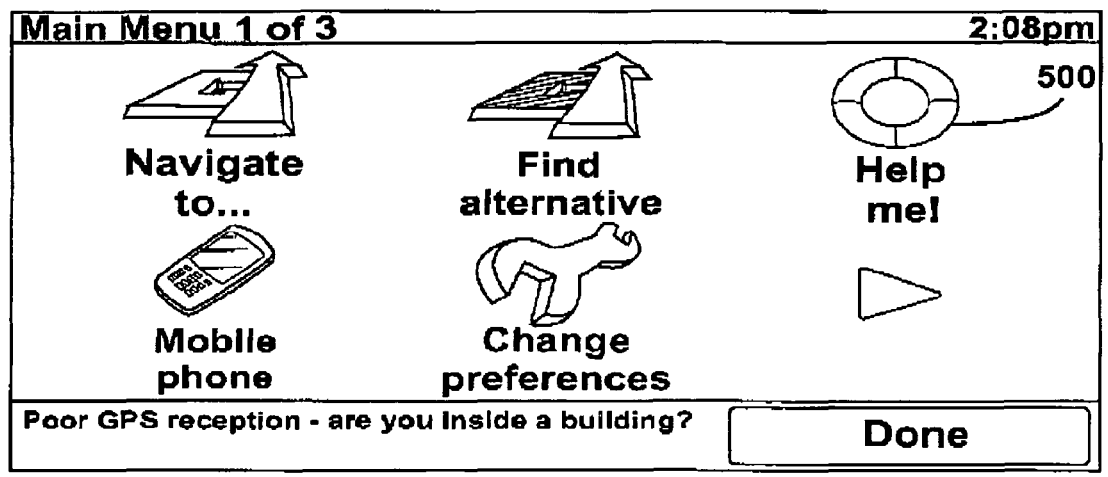
FIG. 6 illustrates an example of a modified embodiment of the present application.

An example embodiment of a method of the present application is shown in FIG. 5. In FIG. 5, a method first includes displaying, in step S2, a selectable icon relating to emergency services. An example of such an icon may be the life preserver 500 shown in FIG. 6, displayed alone or along with additional words such as, "Help Me," "Emergency," etc. Such an icon 600 is displayable on a main menu of a navigation device 200 which may be displayed in many different scenarios; for example, upon a user initially turning power of the navigation device 200 ON; upon a user tapping on an integrated input and display device 290 of the navigation device 200 during use of the navigation device 200, for example in a navigation mode, etc. Display of the icon 600 during use of the navigation device 200 in a navigation mode for example, can include concurrent display with a navigation or tool bar area, a map display area the map information and the route of travel.

Figure 7:
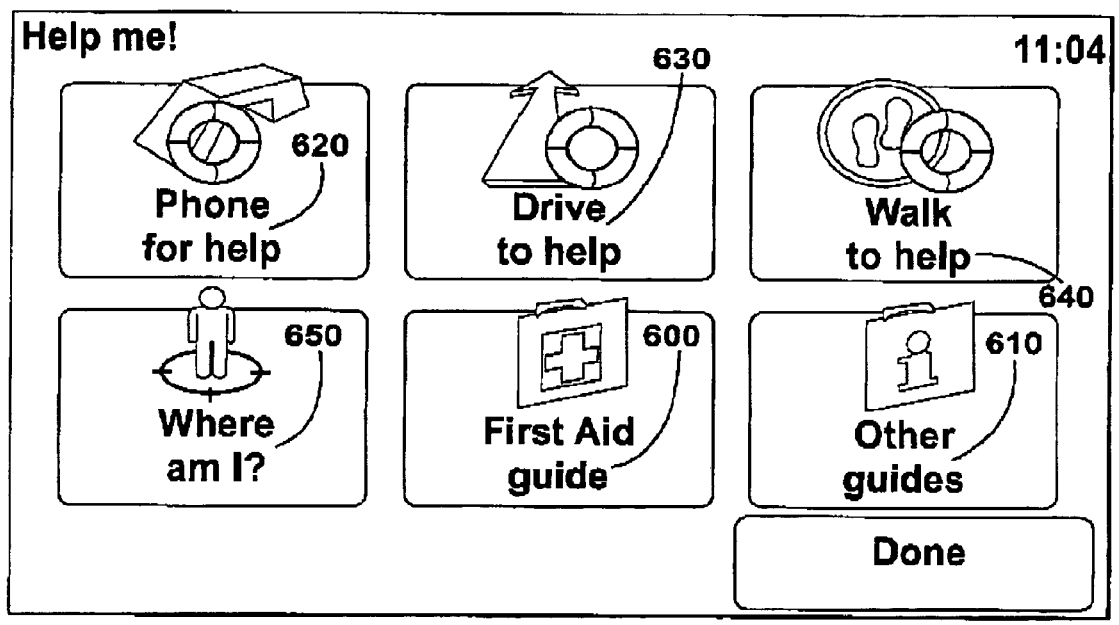
FIG. 7 illustrates an example of a display including emergency service information and emergency service access icons of an embodiment of the present application.

Subsequent to displaying such an icon in step S2, upon a processor 210 receiving an indication of selection of the emergency or service icon 500 in step S4, a plurality of icons are displayed, at least two relating to emergency service information and/or emergency service access. An example of such display is shown in FIG. 7, wherein, subsequent to receipt of an indication of selection of the icon 500 of FIG. 6 for example, relating to emergency services, a plurality of selectable icons may be displayed (alone or along with additional information describing the category of information related to the icon for example). As shown in FIG. 7, these icons relate to at least one of emergency service information, such as the first aid guide 600 and other guides 610; or emergency service access, including the "phone for help" icon 620, the "drive to help" icon 630, the "walk to help" icon 640, and the "where am I" icon 650. Again, each these icons are merely examples and can be varied within the context of embodiments of the present application. Further, the icons may include additional text displayed therewith (such as the words "phone for help" for example), and/or can include the "emergency" icon (the life preserver, for example) and/or can be representative of the emergency service (e.g. phone for help 620 includes phone and life preserver icons; walk for help includes feet and life preserver icons, etc.).

Finally, in step S6 of FIG. 5, upon the processor 210 receiving an indication of selection of one of the icons such as those shown in FIG. 7 for example, further information may be displayed. This further information can include, for example, further display providing needed information, further displays of icons to quickly access information, further displays of routes of travel, etc., examples of which will be discussed in detail hereafter.

Figure 8:
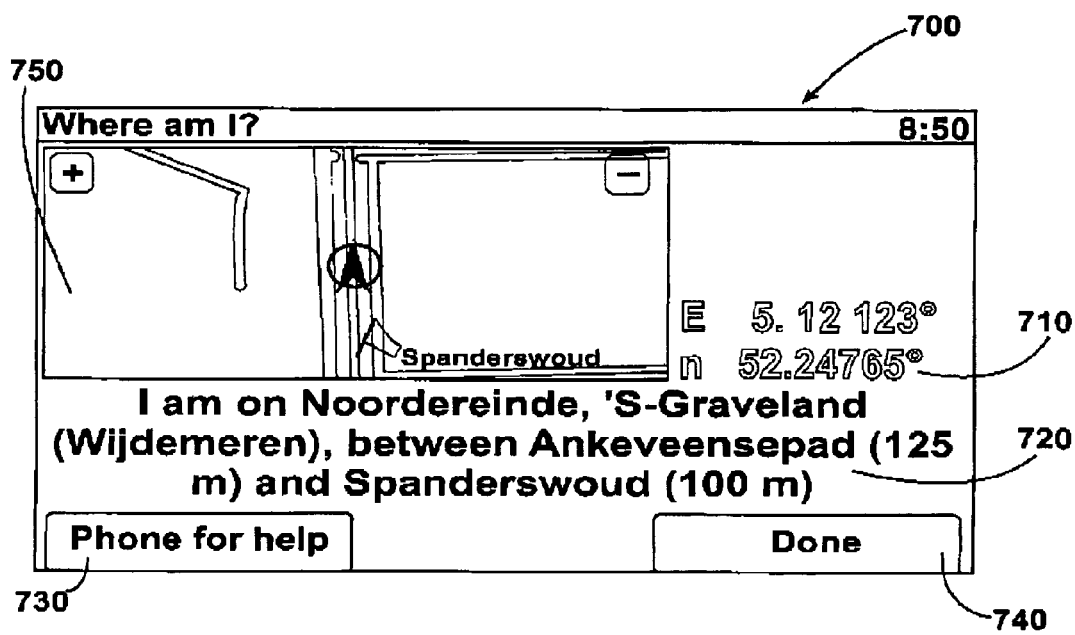
FIG. 8 illustrates an example of a display subsequent to selection of a "where am I" icon of an embodiment of the present application.

FIG. 8 provides an example display of further information, upon a processor 210 of the navigation device 200 receiving an indication of selection of the "where am I" icon 650 of FIG. 7, for example. The display 700 provides information to the user which is important in determining a location/position of the user of the navigation device 200, to enable him/her to more easily phone for help and then convey such location/position information to someone else in an emergency situation, for example. For example, the display 700, displayable on the integrated input and display device 290 of the navigation device 200 for example, may include longitude and latitude information 710, determinable via a GPS location obtained by the processor 210 from a GPS receiver 250 of FIGS. 2 and 3 for example, within the navigation device 200, noting that such a GPS location will hopefully be indicative of a current location of the navigation device 200, but may only be indicative of a last known location, or a location where a GPS signal was received (for example, if the navigation device 200 is currently in a tunnel or other area where GPS signals are not readily received, the processor 210 will only be able to determine a last known location of the navigation device 200, and not a current location of the navigation device 200). If a last known location is used, the processor 210 can calculate a time from a last received GPS signal and the display 700 may convey GPS location information along with an amount of time since a last GPS position signal was received. Further, the time may also be displayed separately on display 700.

Regarding the latitude and longitude information displayed in area 710, this information may be displayed basically as it is received. The latitude and longitude information displayed in area 710 can be displayable in a number of variants, for example, selected in the application preferences. These can include, for example, degrees (d.d°), minutes (d°m.m') and seconds (d°m's"). However, display of the information in area 720 is more involved.

Figure 9A:
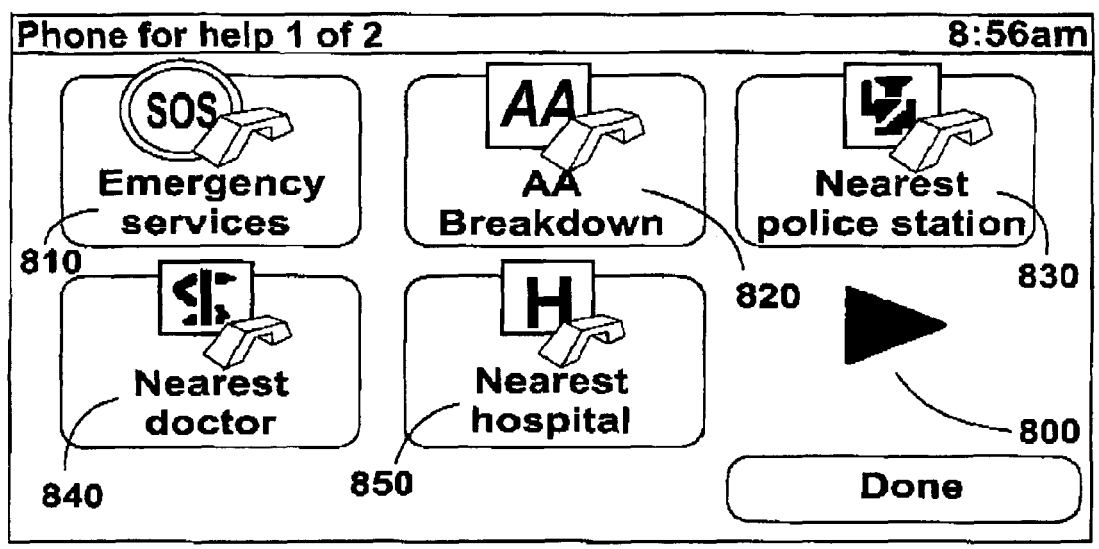
FIGS. 9A-C illustrate examples of a display of icons subsequent to selection of a "phone for help" icon of an embodiment of the present application.
Figure 9B:
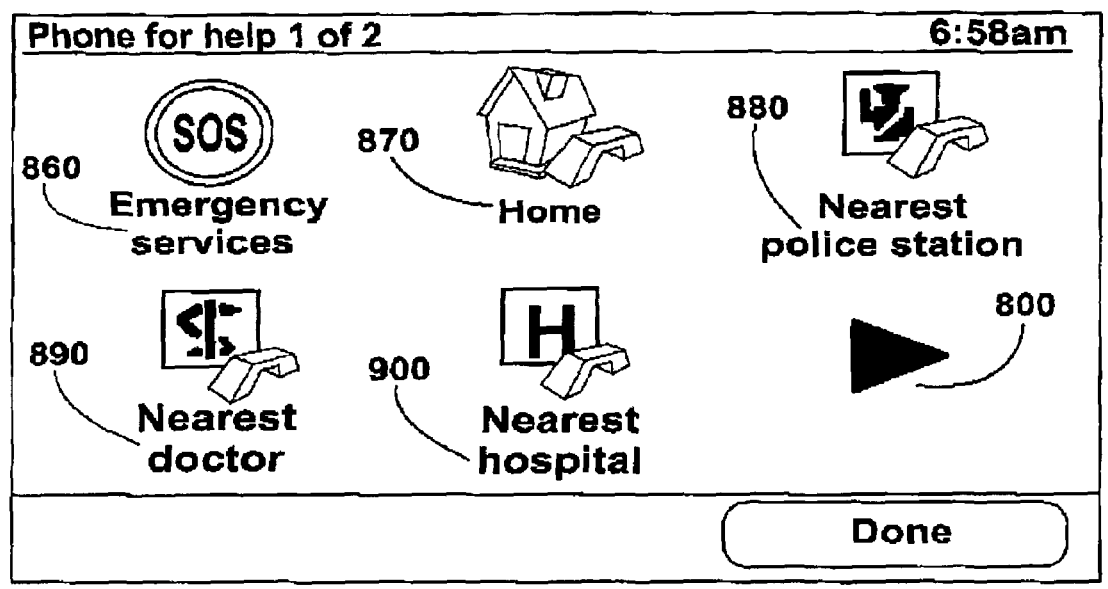

Additionally, the display 700 of FIG. 8 may include a virtual selectable button such as the "phone for help" button shown as element 730 of FIG. 8, wherein selection thereof can access display of the plurality of icons which would normally be accessible via the selection of the "phone for help" icon 620 of FIG. 7 (noting that the "phone for help" button 730 need not be shown unless the user selected the "phone for help" icon 620 of FIG. 7); or can merely dial an emergency number such as 911 in the United States, 112 in some other countries, etc. to immediately connect a user to an emergency operator (upon the navigation device 200 being paired with the navigation device via a Bluetooth or other wireless connection for example). Example of the icons, which could be accessible via the selection of the "phone for help" icon 620 of FIG. 7 or the "phone for help" button 730, are shown in FIGS. 9A and 9B for example, and will be discussed in detail hereafter. After placing a call, the "where am I" screen of FIG. 8 may be displayed.

Further, additional or alternative virtual buttons can be included for selection on the screen shown in FIG. 8, such as the "done" button 740 for example, which can allow the user to return to a previous screen. For example, if the user chooses to call a point of interest (POI), such as a car service, hospital, etc., if this POI is further than a threshold distance (for example 20 km) from the navigation device 200, as determined by the processor 210 for example, an additional button "Navigate there" virtual button may be displayed for selection in FIG. 8. Selection of this button can cause processor 210 to determine a driving route between the present GSP location of the navigation device 200 and the POI destination. Further, if the POI is determined to closer than the threshold distance (20 km for example), then also a virtual button "Walk there" may be displayed (in place of or in addition to the "Navigate there" button. Selection of this button can cause processor 210 to determine a walking route between the present GSP location of the navigation device 200 and the POI destination. Preferably, the "Done" button 740 is always displayed.

Additionally, if the user chooses to phone a POI, then the corresponding phone number may be displayed in screen 700 of FIG. 8, and the name of the corresponding POI may also be displayed in title area (in place of the "where am I" of FIG. 8 for example). If the user chooses to call a general emergency number (like 911 or 112), then the title displayed may read "Emergency services" and the corresponding phone number may be displayed. If the user chooses to call a car service number, then the title may specify the name of the car service (e.g. "AA Breakdown") and the corresponding phone number may be displayed.

Finally, the display 700 can include an area 750 to display the location of the user using map display information. Again, this can be determined by the processor 210, using the received GPS position signal and the stored map information of memory 230.

The inventors discovered that while position can be determined by a GPS receiver within the navigation device 200, such a position is not easily recognizable by a user, especially in an emergency situation where a user may need to identify his/her location. Accordingly, in at least one embodiment, the inventors developed a method to convey to a user, his/her position in text readable form.

In at least one embodiment of the present application, a method includes receiving a request for display of a location of a navigation device 200; determining at least one of a last known and a current GPS location of the navigation device 200; comparing the determined GPS location to stored map information and converting the determined GPS location into a text readable form; and displaying the text readable form of the determined GPS location on an integrated input and display of the navigation device 200.

In at least one embodiment of the present application, a navigation device 200 includes a processor 210 to receive a request for display of a location of a navigation device 200, to determine at least one of a last known and a current GPS location of the navigation device 200, to compare the determined GPS location to stored map information and to convert the determined GPS location into a text readable form; and an integrated input and display device 290 to display the text readable form of the determined GPS location.

In at least one embodiment of the present application, the displayed information of FIG. 8 further can provide the user with a description in text readable form 720, of a GPS location of the user (either last known or current). In at least one embodiment of the present application, a method includes receiving a request for display of a location of a navigation device 200 (via receipt of an indication of selection of the "where am I" icon 650 of FIG. 7 for example); determining a GPS location (at least one of a last known and a current GPS location) of the navigation device 200; comparing, via processor 210 for example, the determined GPS location to stored map information in memory 230 for example and converting the determined GPS location into a text readable form, via a plurality of programmed rules for example; and displaying the text readable form of the determined GPS location on an integrated input and display device 290 of the navigation device 200, in area 700 of FIG. 8 for example.

Thus, upon the processor 210 receiving an indication of selection of the "where am I" button or icon 650 displayed on the integrated input and display device 290 as shown in FIG. 7 for example, a request for the display of the location of the navigation device is received. Further, it should be understood that this display of the "where am I" button or icon 650 may be done subsequent to receipt of an indication of selection of at least one previously displayed icon relating to an emergency, such as the "Help me!" icon 500 of FIG. 6 for example, displayed on the integrated input and display device 290.

The conversion can include, for example, determining at least a roadway on which the navigation device 200 is located; and/or determining at least two roadways proximate to the navigation device 200; and/or determining at least a roadway on which the navigation device 200 is located and then determining at least one relatively nearest roadways crossing the determined roadway. Thus, the displayed information in such a text readable form can include, for example, information such as roadways that the navigation device 200 is currently located on, current cities or villages in which the user is located, and/or roadways proximate to the navigation device 200, and/or crossing a roadway on which the navigation device 200 is located. For example, a processor 210 of the navigation device 200 can receive the aforementioned GPS information (of a known or last known GPS location), and can then compare that GPS information with current map information stored in the memory 230 of the navigation device 200, follow a plurality of programmed rules for conversion to text readable form for example, and then convert the received GPS location information into text readable form for display in area 720 of the integrated input and display device 290, for example.

For example, the processor 210 can search the map information in memory 230 and can attempt to determine at least a roadway on which the navigation device 200 is located (noting that all such locations are at least one of a current GPS location and a last known location). If the processor 210 determines that the navigation device 200 is located on a particular street, road, highway, etc. (generically referenced herein as "roadway"), the processor 210 can review the map information stored in memory 230 in one direction to determine a first cross roadway "x", crossing the roadway on which the navigation device 200 was determined to be located; and then can review the map information stored in memory 230 in an opposite direction to determine another cross roadway "y", crossing the roadway on which the navigation device 200 was determined to be located (if the user is located on a highway instead of a street, the processor 210 can similarly determine the two exits which are located on either side of the navigation device 200 location in a similar manner). As such, the processor 210 can then determine at least one of a roadway on which the navigation device 200 is located; at least two roadways "x" and "y" proximate to the navigation device 200; and a roadway on which the navigation device 200 is located and at least one relatively nearest roadway crossing the determined roadway.

The processor 210 can further calculate distances between a particular cross roadway and the determined location of the navigation device 200 from the map information stored in memory 230. These distances may be rounded up so as to not overcomplicate the description (e.g. 500 yards, 5 miles, etc.). As such, this information can be displayed to the user upon selection of the "where am I" button 650 in the display area 720, wherein the selection of the "where am I" button 650 can be the request to the processor 210 for display of a location of the navigation device 200.

The conversion of a received GPS location into a text readable form for display in area 720 can be done by the processor 210 of the navigation device 200 following a plurality of programmed rules, for example, stored in the processor 210 or in memory 230 for the processor 210.

Regarding the programmed rules, which can be stored in memory 230 for example, the phrase "I am on" can be stored, and can be determined to be used only when the processor 210 is able to determine, via the GPS position signal received and the stored map information in memory 230, the roadway on which the navigation device 200 is actually located. If the processor 210 determines that the navigation device 200 is not on a roadway, but can determine a roadway "z" near or proximate to the navigation device 200, the rules can dictate that another phrase, "I am near ["z"]" for example, can be used. If navigation device 200 is determined, by the processor 210 comparing the received GPS location to the stored map information, to be at a crossing or corner location where two roadways "a" and "b" meet, the rules can dictate that another phrase, the phrase "I am at the corner of street ["a"] and street ["b"]" can be used. As such, the processor 210 can choose from a plurality of ways to begin the conversion of received GPS location information into a text readable form to be displayed in area 720 of display 700, and it should be noted that the definition of rules can be broadened according to the navigation device 200 capabilities.

Further, if the processor 210 determines that a GPS location of the navigation device 200 cannot be determined, the device can determine a last previously known GPS location. In this case, instead of displaying "I am . . . " the rules may dictate that the processor 210 display the words "I was . . . " Further, the number of minutes can also be displayed relating to the last time GPS information was received (as determined by the processor 210 from a difference of a last logged GPS signal receipt and a current time, for example). Thus, the display can read, for example, "I was at the corner of [roadway 1], [city], and [roadway 2], [x] minutes ago." In total, a plurality of predefined descriptions and rules can be stored in memory 230 for access and/or use by the processor 210.

As an additional example, when a navigation device 200 is in an urbanized area, and not on a highway, a first type of description may be used, such as "I am on [roadway] [house number] in [city/state];" for example "I am on 450 Golden Gate Avenue in San Francisco, Calif." When the navigation device 200 is on the highway, another type of description can be used, such as "I am on the [highway] [road name] between [city navigation device 200 has recently passed, close to current position] and [city the user is heading, close to current position], close to exit [exit number] in [state/province]," for example, "I am on the A2 (E35) between Utrecht and Breukelen, 600 meters to exit Breukelen (Exit Number 5) in province Utrecht.

Finally, the programmed rules can also include an option to describe the location of the navigation device 200 based upon proximity to a POI location. For example, the processor 210 can match the location not just against stored map information, but also against POI locations. The output can be, for example, "I am next to the Central Train Station" if the navigation device 200 is determined to be within a threshold distance of a POI, such as the Central Train Station for example. This can be displayed in place of or subsequent with a roadway location.

Further, it should be noted that the display of the "where am I" location can also involve, for example, an audible output. This can be done by the processor 210 operating in conjunction with a text to speech (TTS) module, for example. The language of output may be linked to a language selected by a user of the navigation device 200, and/or a language of a home country of the user. Further, if the user has connected or paired his mobile phone with the navigation device 200, the text of the "where am I" screen of FIG. 8 can be communicated through the mobile phone to a 911 or 112 emergency operator, so that the operator can understand and determine the location of the user and navigation device 200, even if the user is unable to speak (due to an accident, the inability to speak the language, etc.), for example.

Figure 9C:
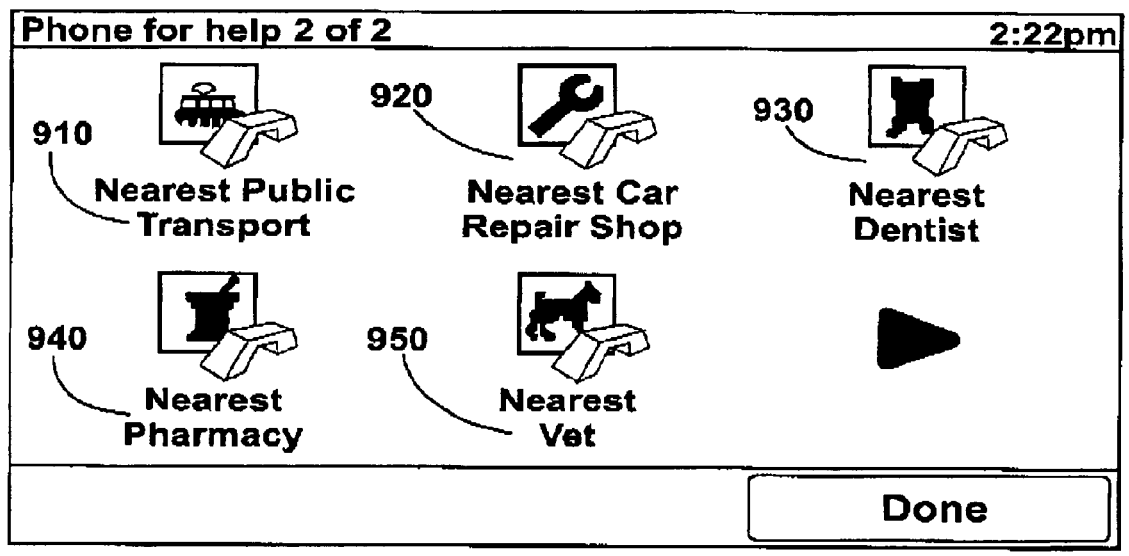

FIGS. 9A-9C show examples of subsequent menus of selectable icons displayable subsequent to selection of the "phone for help" icon 620 for example. Thus, shown in FIGS. 9A-C, upon receipt of indication of selection of one of the plurality of selectable icons such as the "phone for help" icon 620 for example, at least further information may be displayed, including a display of a plurality of selectable icons 810, 820, 830, 840, and 850 of FIG. 9A for example, each relating to navigation to a different category of emergency service locations proximate to at least one of a current location and a last known location of the navigation device 200. Thus, at least one of the plurality of selectable icons shown in FIG. 7 for example, namely the icon "phone for help" 620 shown in FIG. 7 for example, relating to emergency service access, includes an icon relating to access to emergency service locations via telephone.

FIGS. 9A-C provide a showing of a plurality of icons displayed by the integrated input and display device 290 of the navigation device 200 subsequent to the processor 210 receiving an indication of selection of the "phone for help" icon 620 of FIG. 7. As shown in FIGS. 9A-C, the further information displayed upon receipt of an indication of selection of the "phone for help" icon 620 can include, for example, display of a plurality of selectable icon, 810-850 of FIG. 9A, 860-900 of FIG. 9B, or 910-950 of FIG. 9C, each relating to a different category of emergency services proximate to at least one of a current location and a last known location of the navigation device 200 (noting that FIGS. 9A, 9B and 9C show examples of alternative displays of a plurality of selectable icons).

As shown in FIGS. 9A and 9B the emergency service information under the "phone for help" icon 620 include Emergency Services 810, AA Breakdown 820, Nearest Police Station 830, Nearest doctor 840, and Nearest hospital 850; with FIG. 8B including Emergency Services 860, Home 870, Nearest Police Station 880, Nearest doctor 890, and Nearest hospital 900. Each of these icons is preferably displayed along with some written description indicating the emergency service category. Further, it should be understood that the present application is not limited to these icons as different icons can be used.

Further, shown in FIG. 9C, it should be noted that additional icons could also be displayable, in addition to those shown in either FIG. 9A or 9B for example 9 for example, upon selection of the arrow icon 800 of FIGS. 9A and 9B, additional selectable icons such as those of FIG. 9C may be displayed. These icons can include, but are not limited to, nearest public transport 910, nearest car repair shop 920, nearest dentist 930, nearest pharmacy 940, nearest vet 950. Thus, in at least n one embodiment of the present application, the different categories of emergency service locations include at least one of car repair facilities, hospitals, doctors, police stations, pharmacies and dentists. Again, a plurality of icons can be displayed in connection with the scrolling icon key designated by element 800 in FIGS. 9A and 9B, allowing for a next screen of icons to be displayed.

As shown in FIGS. 9A-9C, different icons relating to different categories of emergency services, can be displayed, wherein display preferably relates to a relatively "nearest" emergency service provider such as nearest police station 830, 880, nearest doctor 840, 890, etc. The relatively nearest police station, doctor, hospital, etc. can be determined by first determining a current or last known location of a navigation device 200 via the current or last known GPS signal received. Thereafter, relatively newest information in any particular category can be determined by the processor 210 comparing the current or last known GPS information to stored information in the navigation device 200.

It should be noted that the embodiments of the invention are not limited by the particular icons displayed in FIGS. 9A-C, either in configuration/display, or in type. For example, the type of icons displayed and the categories that they represent may be displayed based upon other information stored in the navigation device 200. For example, the display of icons and categories thereof can vary based upon a current location or home location of the navigation device 200. One example might be, if the navigation device is registered in the United States, then "Nearest fire station" may be displayed as an icon in FIGS. 9A-C. Thus, the number and types of emergency categories can vary per country/region, including the icons therefore.

Figure 10A:
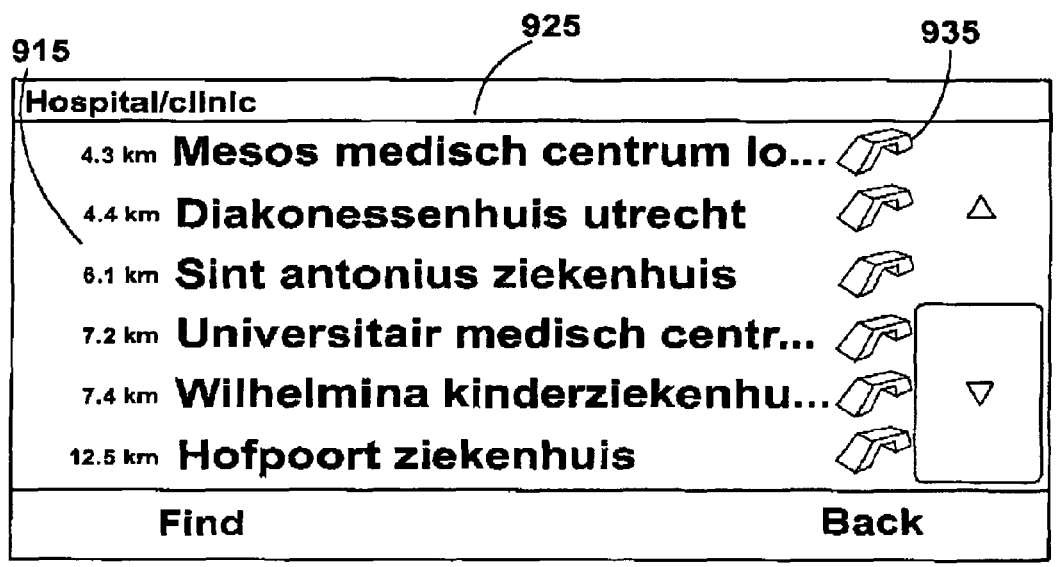
FIG. 10A-D illustrate examples of further displays subsequent to selection of a "phone for help" icon of an embodiment of the present application.

Accordingly, upon receipt of an indication of selection of one of the selectable icons shown in FIGS. 9A-9C for example, the integrated input and display device 290 may subsequently display a phone number of the relatively nearest selected emergency service. Additionally, or along with the relatively nearest selected emergency service, the integrated input and display device 290 can display a listing, of the selected category, of emergency services determined to be relatively nearest to at least one of a current location and last known location of the navigation device 200, as shown in FIG. 10A, and assembled by processor 210 for example. With regard to FIG. 10A-C, the processor 210 can determine, in response to receipt of an indication of selection of one of the plurality of icons relating to a category of emergency services, emergency services and corresponding relative distances to at least one of a current location and a last known location of the navigation device 200. This can further include distance information 915, location or identification information 925, and either a phone number and/or a prompt for dialing the phone number (the prompt being shown by the phone symbol 935 of FIG. 10A). Thus, the emergency services may each displayed with information indicating relative distance 915 between a location emergency service and at least one of a current location and a last known location of the navigation device 200. Further, the integrated input and display device 290 may include display of a prompt 935 for dialing a phone number of the relatively nearest selected emergency service (the first displayed entry of FIG. 10A for example). If the phone number is not available, the phone icon 935 may be grayed out for example.

If the user of the navigation device 200 has his/her telephone (mobile phone for example, via a Bluetooth or other wireless connection) is paired with the navigation device 200, the navigation device 200 can automatically dial a phone number of a selected emergency service by selection of the one of a plurality of displayed emergency services as shown in FIG. 10A for example. This can be done via an existing Bluetooth or otherwise wireless telephone connection between a wireless telephone of a user and the navigation device 200 for example. Alternatively, instead of pairing, if the navigation device has mobile phone capabilities internally then the navigation device 200 can automatically dial a phone number of a selected emergency service by selection of the one of a plurality of displayed emergency services as shown in FIG. 10A for example. If the user hasn't paired his telephone with the navigation device 200, a flash message may be shown indicating "phone not connected" for example. If the user has paired his telephone with the navigation device 200 previously, but is not currently connected through Bluetooth or other wireless connection, the connection can just be reestablished and the message showing "connecting" may be shown.

Figure 10B:
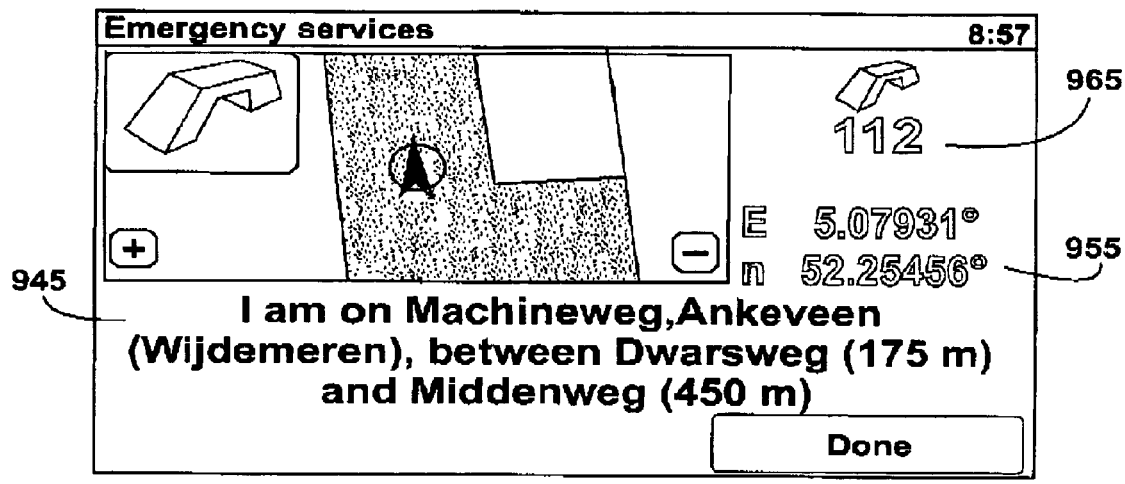

Subsequent to dialing a phone number of one of the displayed relatively nearest emergency services as shown in FIG. 10A, the "Where am I" screen of FIG. 10B (or as previously described regarding FIG. 8) can be displayed to the user on the integrated input and display device 290, for example. This screen can be displayed to provide the user with his current location, in text readable form for example, to make it easy for the user to provide this information to someone at the emergency service location answering his phone call. The information can be displayed in text readable form as shown by element 945 of FIG. 10B, along with longitude and latitude information as shown by element 955 of FIG. 10B, for example. Further, at least one additional icon 965 can be displayed to the user, for making an emergency 911 or 112 phone call for example. Once this particular icon is selected, a screen such as that shown in FIG. 10D can be displayed (or need not be displayed, in this situation and/or in the situation of the phone for help button 730 of FIG. 8 being selected), confirming that the user wishes to dial a 911 or 112 emergency number. In such an instance, the initial phone call may be disconnected and the emergency 911 or 112 call may be placed, as long as the user's phone is still paired with the navigation device 200 in a manner described previously (or internal capabilities exist within the navigation device 200). Alternatively, or in addition thereto, an SMS message can also be sent to the 911 or 112 operator.

Figure 10C:
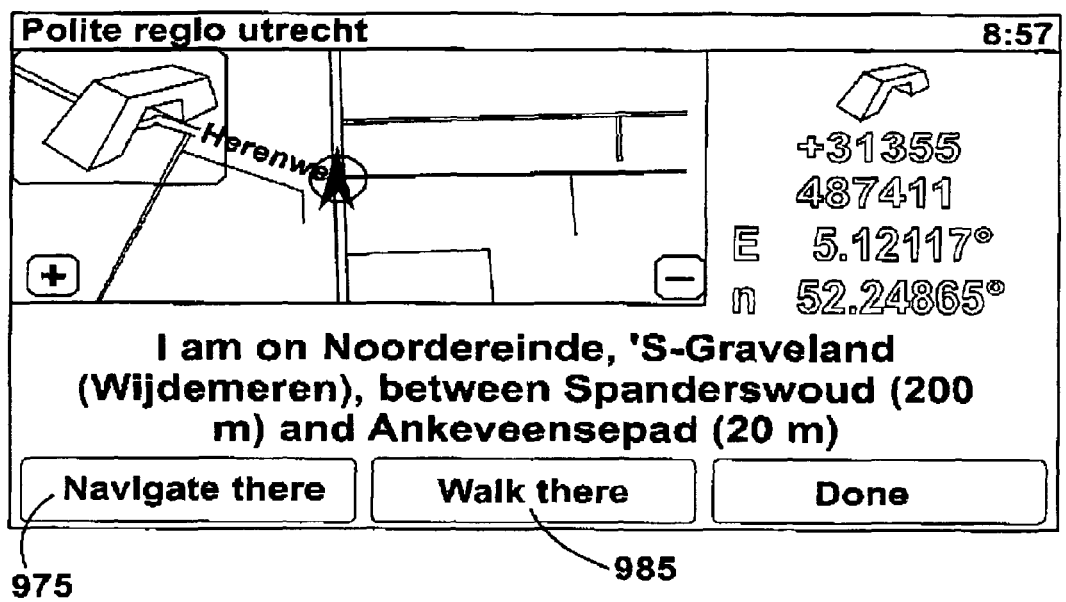
Figure 10D:
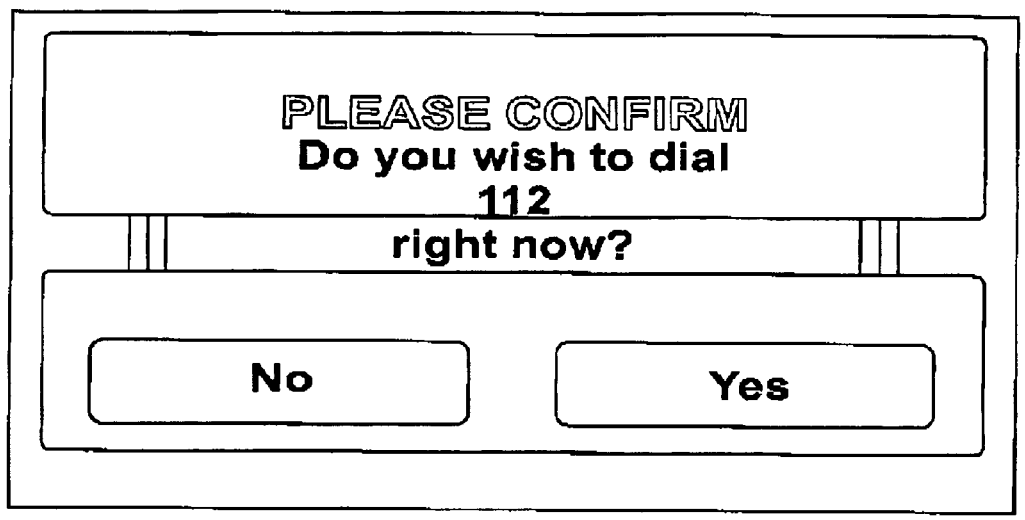

Optionally, a screen such as that shown in FIG. 10C can be displayed to a user upon the processor 210 receiving an indication of selection of a relatively nearest emergency service in FIG. 10A, wherein additional information such as additional virtual buttons 975 and 985 can be displayed to the user. Upon receipt of an indication of selection of the button 985 by processor 210 for example, instructions for navigating to a relatively nearest selected emergency service location can be determined and displayed; and/or upon receipt of an indication of selection of button 985 by the processor 210, instructions can be determined and displayed to a user for walking to a selected relatively nearest emergency service location. These instructions can be determined or calculated by a processor 210 of the navigation device 200 in a known manner, and subsequently displayed to the user on the integrated input and display device 290 of the navigation device 200.

Figure 11:
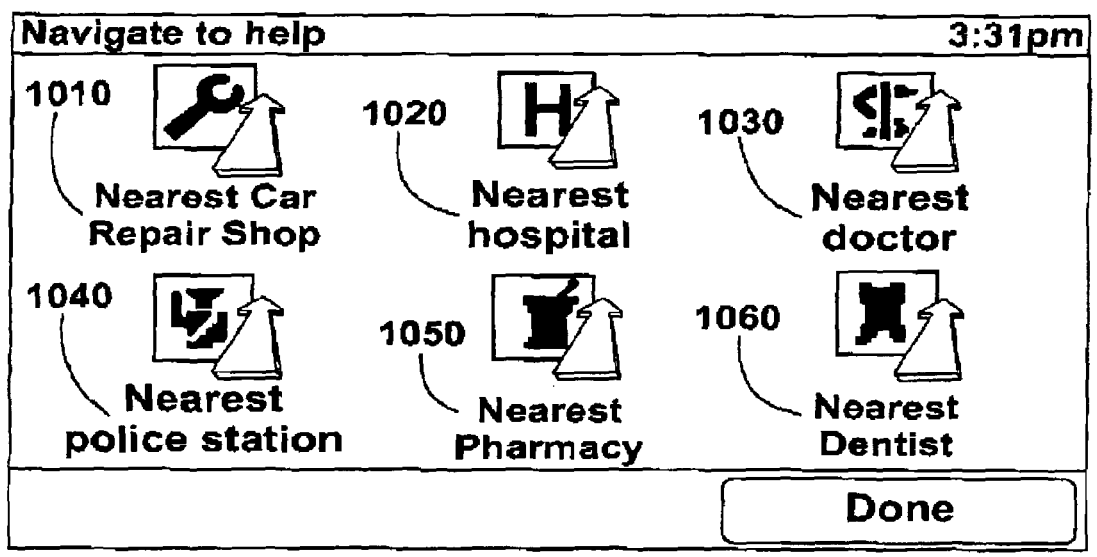
FIG. 11 illustrates an example of a display subsequent to selection of a "drive to help" icon of an embodiment of the present application.

FIG. 11 illustrates a display of icons corresponding to the category represented by the "drive to help" icon 630 of FIG. 7. Such an icon is at least one of a plurality of selectable icons relating to emergency service access, and it relates to navigation to emergency service locations proximate to at least one of a current location and last known location of the navigation device 200. Upon receipt of an indication of selection of such a one of the plurality of selectable icons, by processor 210 for example, the at least further information displayed in response thereto may include a display of a plurality of selectable icons, each relating to navigation to a different category of emergency service locations proximate to at least one of a current location and a last known location of the navigation device 200, such as those displayed in FIG. 11 for example.

Figure 12A:
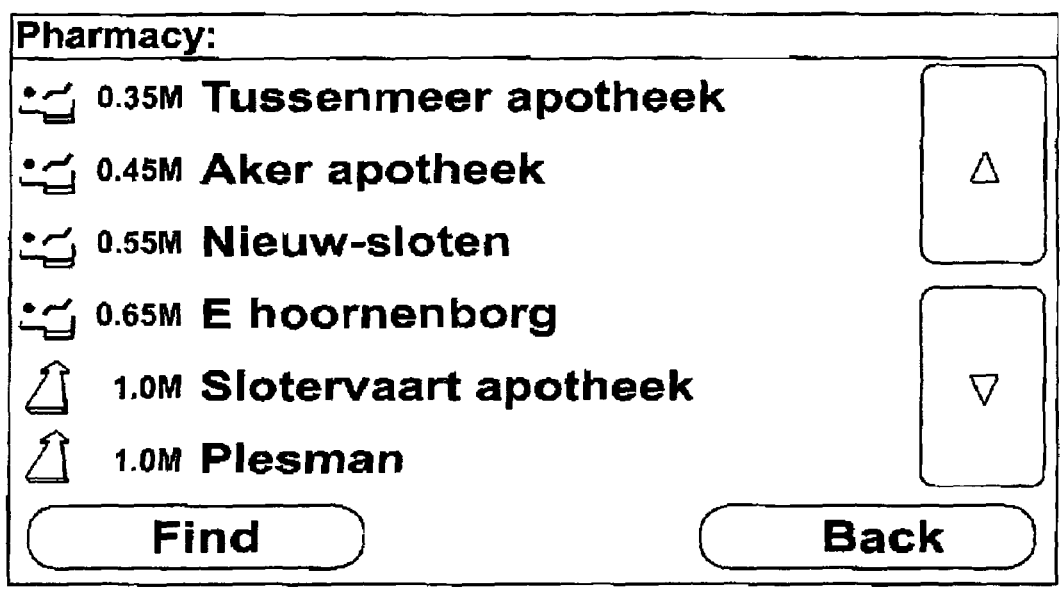
FIGS. 12A-C illustrate examples of displays subsequent to selection of a "drive to help" icon of an embodiment of the present application.
Figure 12B:
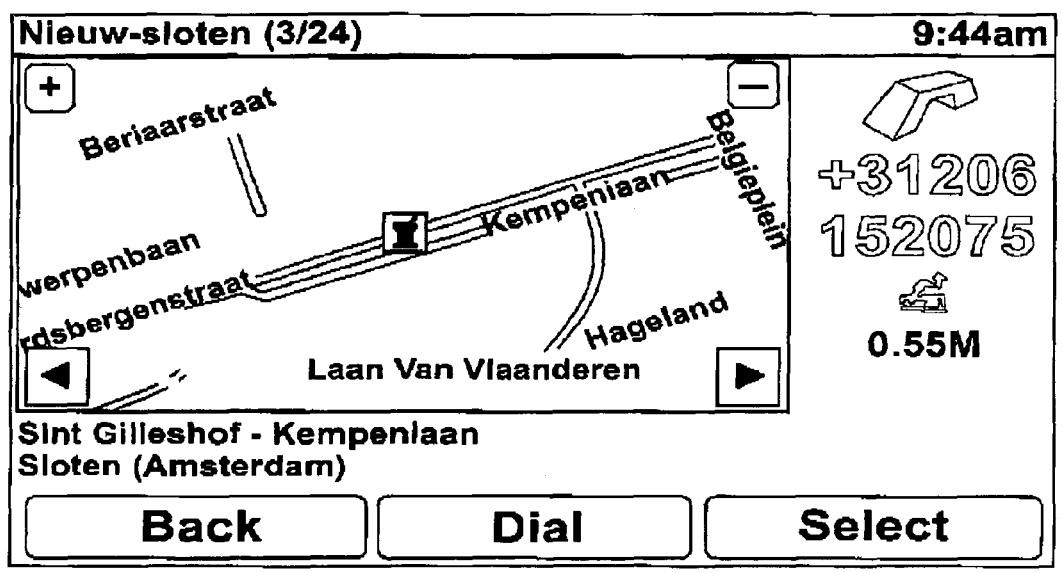
Figure 12C:
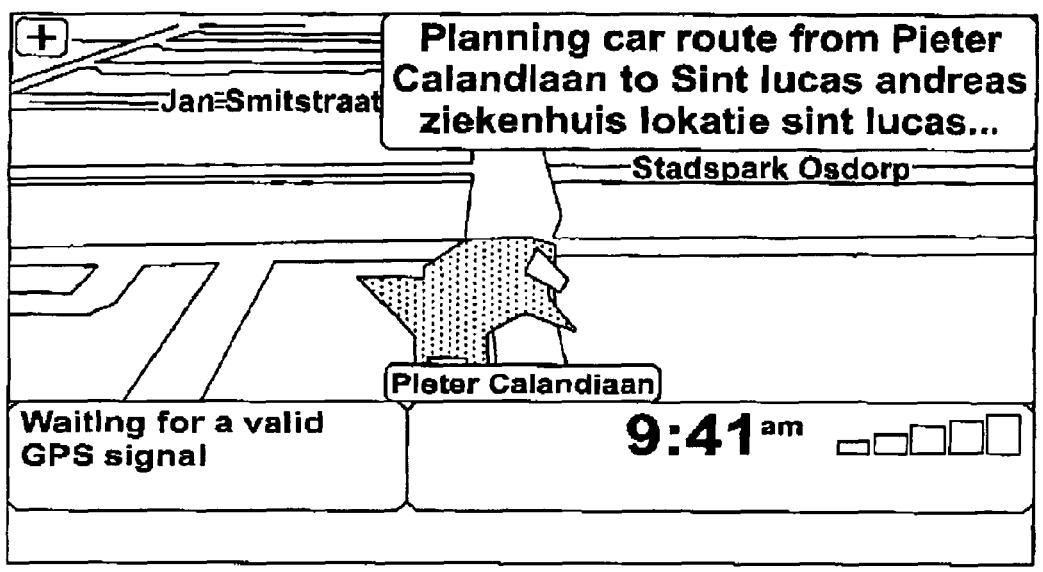

In the example embodiment shown in FIG. 11, the plurality of icons may relate to navigation to different categories of emergency service locations proximate to the navigation device 200 such as nearest car repair shop 1010, nearest hospital 1020, nearest doctor 1030, nearest police station 1040, nearest pharmacy 1050, nearest dentist 1060. In response to selection of the "nearest pharmacy" icon 1050 for example, emergency services and corresponding relative distances to at least one of a current location and a last known location of the navigation device 200 may be determined and displayed as shown in FIG. 12A for example. Once determined by the processor 210 of the navigation device 200, a listing of emergency services determined to be relatively nearest to at least one of a current location and a last known location of the navigation device 200 may be displayed, for example, in a manner shown in FIG. 12A of the present application. The emergency services may each be displayed with information indicating relative distance of location of the emergency service and at least one of a current location and a last known location of the navigation device 200. Once an emergency service displayed in FIG. 12A is selected, its location and optionally its phone number can be displayed to a user as shown in FIG. 12B. Finally, as shown in FIG. 12C, if selected, a travel route from the selected location to the user can be planned in a normal route planning manner by processor 210, noting the beginning location being the current location of the navigation device 200 (or last known location), and the final destination location being the selected emergency service provider.

As previously indicated with regard to FIG. 7, one of the selectable icons displayed on the navigation device 200 may relate to "walk to help" icon 640. Thus, at least one of the plurality of selectable icons relating to emergency service access may include an icon relating to navigation via a vehicle to emergency service locations (icon 630, the drive to help icon for example), and at least one of a plurality of selectable icons may relate to emergency service access may include an icon relating to navigation via foot travel to emergency service locations (icon 640 entitled "walk to help," for example). Upon receipt of an indication of selection of the icon 640 by the processor 210 for example, a plurality of selectable icons, each relating to navigation to a different category of emergency service locations proximate to at least one of a current location and a last known location of the navigation device 200 may be displayed. This can include, for example, the icons of FIG. 13 including icon 1100 entitled "Nearest petrol station," icon 1110 entitled "Nearest public transport," icon 1130 entitled "Nearest police station", icon 1140 entitled "Nearest Pharmacy," and icon 1150 entitled "Nearest doctor." Again, these are merely exemplary, but these are icons which each relate to navigation to a different category of emergency service locations proximate to at least one of a current location and a last known location of the navigation device 200.

Figure 13:
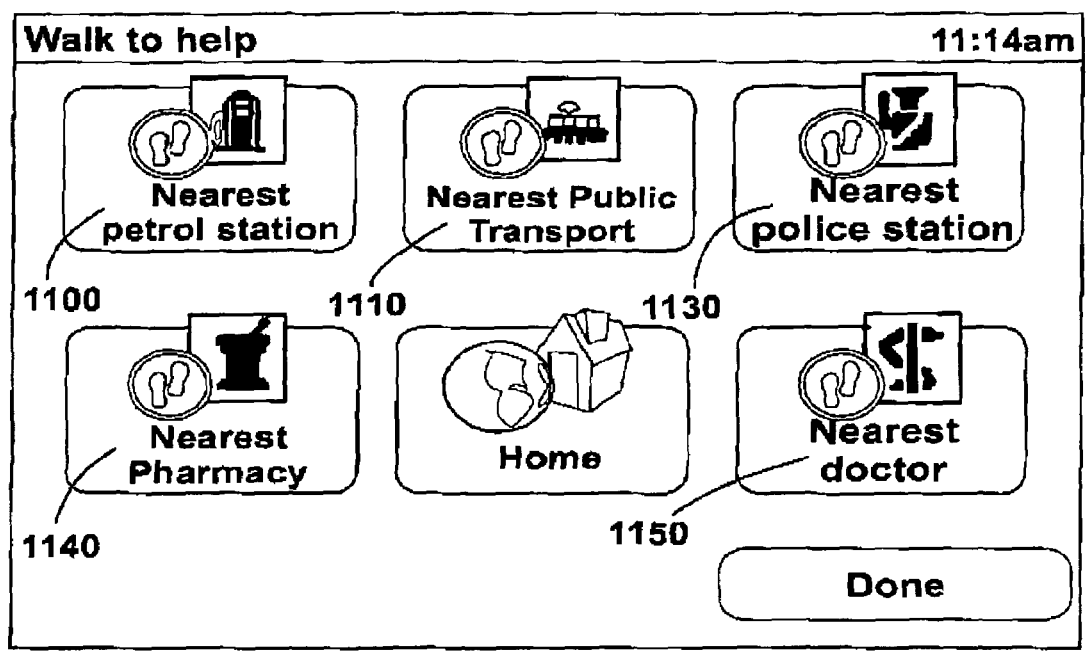
FIG. 13 illustrates an example of a display subsequent to selection of a "walk to help" icon of an embodiment of the present application.
Figure 14A:
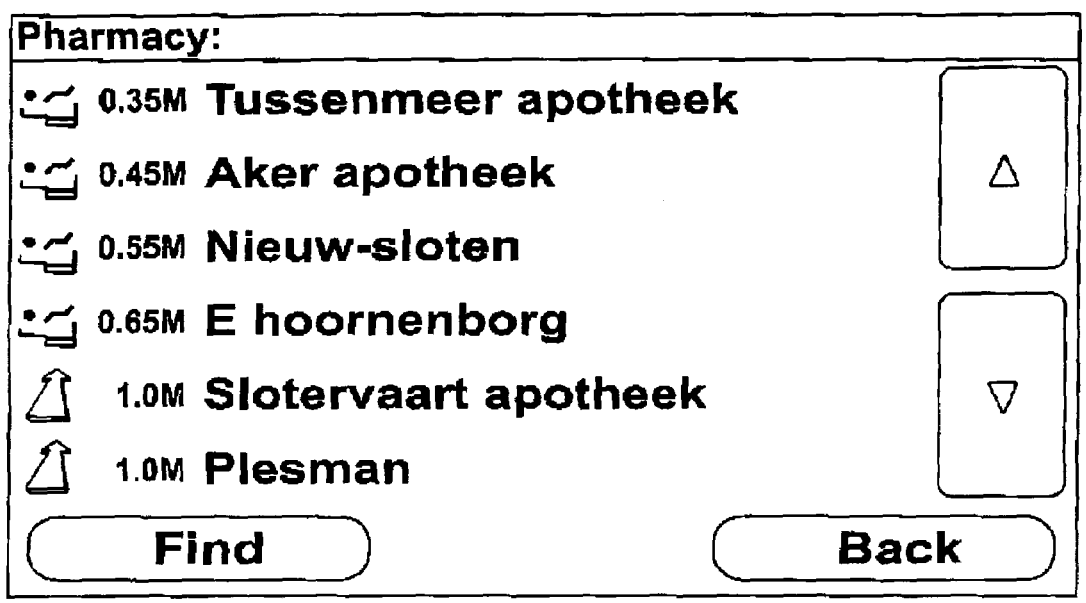
FIGS. 14A-C illustrate examples of displays subsequent to selection of a "walk to help" icon of an embodiment of the present application.

In response to receipt of an indication of selection of one of the plurality of icons relating to a category of emergency services, such as that of the icons 1100-1150 shown in FIG. 13 for example, the processor 210 is able to determine emergency services and corresponding relative distances to at least one of a current location and a last known location of the navigation device 200. Thereafter, the integrated input and display device 290 can display a listing, of the selected category, of emergency services determined to be relatively nearest to at least one of a current location and a last known location of the navigation device 200 as shown in FIG. 14A for example, noting that similar to FIG. 12A, these can include titles of the emergency service locations and information indicating relative distances between a location of the emergency service and at least one of a current location and a last known location of the navigation device 200.

Figure 14B:
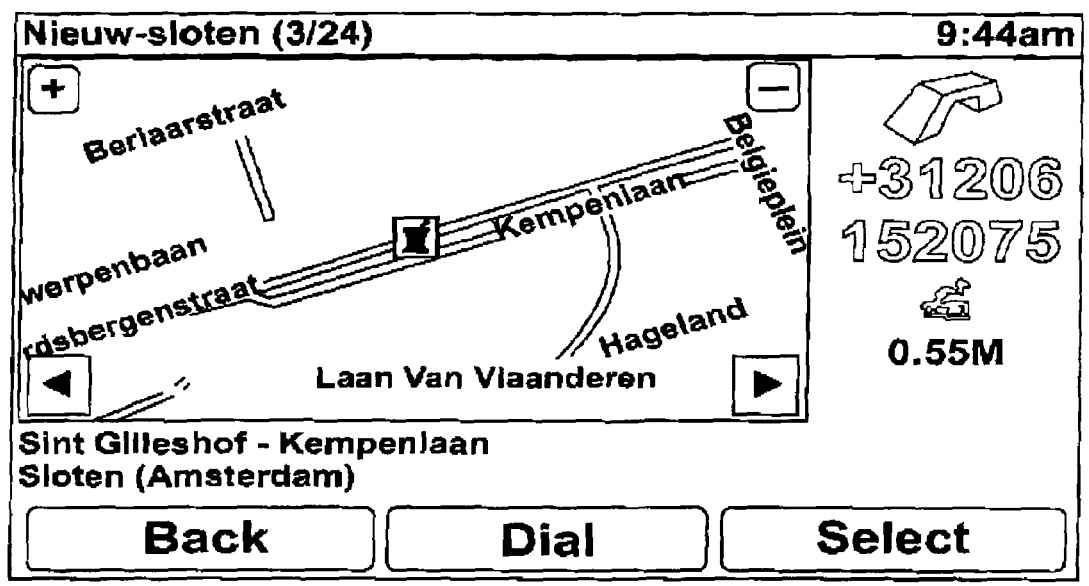
Figure 14C:
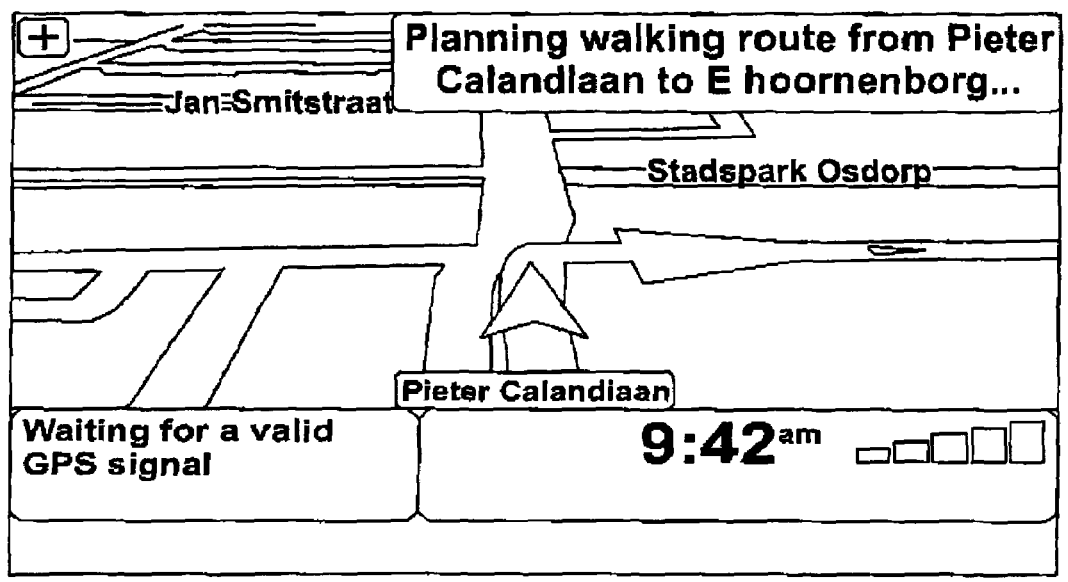

Again, as shown in FIG. 13, the different categories of emergency service locations can include at least one of car repair facilities, hospitals, doctors, police stations, pharmacies, and dentists, as well as other categories of information such as nearest petrol station 1100, nearest public transport 1110, etc. Further, after selection thereof, map information and potentially a phone number can be displayed as shown in FIG. 14B and a walking route can be calculated and displayed to a user as shown in FIG. 14C, from the current location or the last known location of the navigation device 200 to a selected emergency service provider.

Finally, the selectable icons displayed on the navigation device 200 as shown in FIG. 7 can include icons relating to emergency service information, such as first aid guide 600 and other guides icon 610. Upon selected, these icons can access information in a file format such as html, for example, through a rich text viewer for example, the information including such as first aid information, car maintenance information etc. In connection with abilities to view and find this information, reference is made to U.S. application Ser. No. 11/907,257, entitled A NAVIGATION DEVICE AND METHOD FOR DISPLAYING A RICH CONTENT DOCUMENT One non-limiting example of the "other guides" may include car maintenance information, for example. This information and other "other guides" information can include information provided based upon other parameters stored in the navigation device 200. For example, if the processor 210 recognizes an indication of selection of the and other guides icon 610, a menu of popular choices can be displayed, such as car maintenance information, for example. If this is selected, the processor 210 can provide display of information, via the rich text viewer for example, based upon other provided based upon other parameters such as the language chose by the user, the home country of the user, the current country in which the user is located, etc. Since the files, in html for example, are on the navigation device 200, additional content can be provided such as, for example, tourist information in a city; within the text anchors can be added which, when selected, show location in a map, navigate to a location, call a number, etc. It is also possible to dynamically insert information, such as, for tourist information for example, adding a distance to a hotel described.

It should be noted that each of the aforementioned aspects of an embodiment of the present application have been described with regard to the method of the present application. However, at least one embodiment of the present application is directed to a navigation device 200, including a processor 210 to receive a request for display of a location of a navigation device 200, to determine at least one of a last known and a current GPS location of the navigation device 200, to compare the determined GPS location to stored map information and to convert the determined GPS location into a text readable form; and an integrated input and display device 290 to display the text readable form of the determined GPS location. Thus, such a navigation device 200 may be used to perform the various aspects of the method described with regard to FIGS. 6-14C, as would be understood by one of ordinary skill in the art. Thus, further explanation is omitted for the sake of brevity.

The methods of at least one embodiment expressed above may be implemented as a computer data signal embodied in the carrier wave or propagated signal that represents a sequence of instructions which, when executed by a processor (such as processor 304 of server 302, and/or processor 210 of navigation device 200 for example) causes the processor to perform a respective method. In at least one other embodiment, at least one method provided above may be implemented above as a set of instructions contained on a computer readable or computer accessible medium, such as one of the memory devices previously described, for example, to perform the respective method when executed by a processor or other computer device. In varying embodiments, the medium may be a magnetic medium, electronic medium, optical medium, etc.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

As one of ordinary skill in the art will understand upon reading the disclosure, the electronic components of the navigation device 200 and/or the components of the server 302 can be embodied as computer hardware circuitry or as a computer readable program, or as a combination of both.

The system and method of embodiments of the present application include software operative on the processor to perform at least one of the methods according to the teachings of the present application. One of ordinary skill in the art will understand, upon reading and comprehending this disclosure, the manner in which a software program can be launched from a computer readable medium in a computer based system to execute the functions found in the software program. One of ordinary skill in the art will further understand the various programming languages which may be employed to create a software program designed to implement and perform at least one of the methods of the present application.

The programs can be structured in an object-orientation using an object-oriented language including but not limited to JAVA, Smalltalk, C++, etc., and the programs can be structured in a procedural-orientation using a procedural language including but not limited to COBOL, C, etc. The software components can communicate in any number of ways that are well known to those of ordinary skill in the art, including but not limited to by application of program interfaces (API), interprocess communication techniques, including but not limited to report procedure call (RPC), common object request broker architecture (CORBA), Component Object Model (COM), Distributed Component Object Model (DCOM), Distributed System Object Model (DSOM), and Remote Method Invocation (RMI). However, as will be appreciated by one of ordinary skill in the art upon reading the present application disclosure, the teachings of the present application are not limited to a particular programming language or environment.

The above systems, devices, and methods have been described by way of example and not by way of limitation with respect to improving accuracy, processor speed, and ease of user interaction, etc. with a navigation device 200.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method performed by a navigation device, comprising:
receiving a request for display of a location of the navigation device;
determining at least one of a last known and a current GPS location of the navigation device;

comparing the determined GPS location to stored map information and converting the determined GPS location into a readable text description, wherein:
said comparing comprises determining at least one element of map information associated with the determined GPS location; and
said description comprises:
readable text information corresponding to one or more said determined element of map information; and
readable text information indicating the relative location of the navigation device to said one or more said determined element of map information; and
displaying the description of the determined GPS location on an integrated input and display of the navigation device.

2. The method of claim 1, wherein the conversion includes determining at least a roadway on which the navigation device is located.

3. The method of claim 1, wherein the conversion includes determining at least two roadways proximate to the navigation device.

4. The method of claim 2, wherein the determining includes determining at least a roadway on which the navigation device is located and then determining at least one relatively nearest roadways crossing the determined roadway.

5. The method of claim 2, wherein the conversion further includes determining at least two roadways proximate to the navigation device.

6. The method of claim 4, wherein the determining includes determining at least a roadway on which the navigation device is located and then determining at least two relatively nearest roadways crossing the determined roadway.

7. The method of claim 1, further comprising displaying at least one selectable icon on the integrated input and display device, wherein subsequent to receipt of an indication of selection thereof, the request is received.

8. The method of claim 7, further comprising displaying, subsequent to receipt of an indication of selection of at least one displayed selectable icon, at least one other icon is displayed which, when selected, initiates the receiving of the request for display of the location of the navigation device.

9. The method of claim 7, wherein the at least one selectable icon includes a selectable icon relating to an emergency and the method further comprising displaying, subsequent to receipt of an indication of the selectable icon relating to an emergency, at least one other icon is displayed which, when selected, initiates the receiving of the request for display of the location of the navigation device.

10. The method of claim 7, wherein the at least one selectable icon includes a selectable icon relating to an emergency and further comprising:
determining, in response to receipt of an indication of selection one of the plurality of icons relating to a category of emergency services, emergency services and corresponding relative distances to at least one of a current location and a last known location of the navigation device; and
displaying a listing, of the selected category, of emergency services determined to be relatively nearest to at least one of a current location and a last known location of the navigation device.

11. A computer readable medium including program segments for, when executed on a processor of a navigation device, causing the navigation device to implement the method of claim 1.

12. A navigation device, comprising:
a processor to receive a request for display of a location of a navigation device, to determine at least one of a last known and a current GPS location of the navigation device, to compare the determined GPS location to stored map information and to convert the determined GPS location into a readable text description, wherein:
said comparing comprises determining at least one element of map information associated with the determined GPS location; and
said description comprises:
readable text information corresponding to one or more said determined element of map information; and
readable text information indicating the relative location of the navigation device to said one or more said determined element of map information; and
an integrated input and display device to display the description of the determined GPS location.

13. The navigation device of claim 12, wherein the converting includes the processor being further used to determine at least a roadway on which the navigation device is located.

14. The navigation device of claim 12, wherein the converting includes the processor being further used to determine at least two roadways proximate to the navigation device.

15. The navigation device of claim 13, wherein the determining includes the processor being further used to determine at least a roadway on which the navigation device is located and then to determine at least one relatively nearest roadways crossing the determined roadway.

16. The navigation device of claim 13, wherein the converting further includes the processor being further used to determine at least two roadways proximate to the navigation device.

17. The navigation device of claim 16, wherein the determining includes the processor being further used to determine at least a roadway on which the navigation device is located and then to determine at least two relatively nearest roadways crossing the determined roadway.

18. The navigation device of claim 12, wherein the integrated input and display device is further useable to display at least one selectable icon, wherein subsequent to the processor receiving indication of selection thereof, the request is received by the processor.

19. The navigation device of claim 18, wherein the integrated input and display device is further useable to display, subsequent to the processor receiving an indication of selection of at least one displayed selectable icon, at least one other icon which, when selected, initiates the receiving of the request for display of the location of the navigation device.

20. The navigation device of claim 18, wherein the at least one selectable icon includes a selectable icon relating to an emergency.

21. The navigation device of claim 20, wherein the integrated input and display device is further useable to display, subsequent to the processor receiving an indication of selection of at least one displayed selectable icon, at least one other icon which, when selected, initiates the receiving of the request for display of the location of the navigation device.

22. The navigation device of claim 19, wherein the at least one other icon is displayed on the integrated input and display device with a plurality of selectable icons, subsequent to the processor receiving an indication of the least one selectable icon, at least one of plurality of selectable icons relating to at least one of emergency service information and emergency service access.

23. The navigation device of claim 21, wherein the at least one other icon is displayed on the integrated input and display device with a plurality of selectable icons, subsequent to the processor receiving an indication of the selectable icon relating to an emergency, at least one of plurality of selectable icons relating to at least one of emergency service information and emergency service access.

24. The navigation device of claim 22, wherein at least one of the plurality of selectable icons relating to emergency service access includes an icon relating to navigation to emergency service locations proximate to at least one of a current location and a last known location of the navigation device.

25. The navigation device of claim 23, wherein at least one of the plurality of selectable icons relating to emergency service access includes an icon relating to navigation to emergency service locations proximate to at least one of a current location and a last known location of the navigation device.

26. The navigation device of claim 25, wherein the processor is further useable to determine, in response to receipt of an indication of selection one of the plurality of icons relating to a category of emergency services, emergency services and corresponding relative distances to at least one of a current location and a last known location of the navigation device.

27. The method of claim 1, the method further comprising:
calculating a time from a last received GPS signal, and
displaying the amount of time passed since the last GPS signal was received.

28. The navigation device of claim 12, wherein the processor is further usable to
calculate a time from a last received GPS signal, and the integrated input and display device is further usable to display an amount of time passed since a last GPS signal was received.

29. The method of claim 1, wherein the converting comprises following a plurality of pre-programmed rules comprising determining a format of the description from a plurality of formats.

30. The method of claim 29, wherein the pre-programmed rules include selecting between a precise location and an approximate location.

31. The method of claim 29, wherein the pre-programmed rules comprise selecting a format referencing a location relative to a single said determined element versus two said determined elements.

32. The method of claim 29, wherein the pre-programmed rules include selecting between referencing a POI as said at least one element and an intersection as said at least one element.

33. The method of claim 29, wherein the pre-programmed rules comprise selecting between forming the description in the present tense versus the past tense.

34. The method of claim 29, wherein the plurality of pre-programmed rules comprise selecting between referencing a street address versus a POI or intersection.

35. The method of claim 1, wherein the readable text information is displayed responsive to placing an emergency call.

36. The method of claim 1, wherein the description comprises a street location and a location relative to a POI and the displaying comprises displaying these sequentially.

37. The method of claim 1, wherein the displaying is in addition to a labeled map.

38. the method of claim 37, wherein:
the displaying is simultaneously with an emergency services telephone icon; and
the description persists during an emergency call made using the icon.

39. The device of claim 12, wherein the converting comprises following a plurality of pre-programmed rules comprising determining a format of the description form a plurality of formats.

40. The device of claim 39, wherein the pre-programmed rules include selecting between a precise location and an approximate location.

41. The device of claim 39, wherein the pre-programmed rules comprise selecting a format referencing a location relative to a single said determined element versus two said determined elements.

42. The device of claim 39, wherein the pre-programmed rules include selecting between referencing a POI as said at least one element and an intersection as said at least one element.

43. The device of claim 39, wherein the pre-programmed rules comprise selecting between forming the description in the present tense versus the past tense.

44. The device of claim 39, wherein the plurality of pre-programmed rules comprise selecting between referencing a street address versus a POI or intersection.

45. The device of claim 12, wherein the readable text information is displayed responsive to placing an emergency call.

46. The device of claim 12, wherein the description comprises a street location and a location relative to a POI and the displaying comprises displaying these sequentially.

47. The device of claim 12, wherein the displaying is in addition to a labeled map.

48. The device of claim 47, wherein:
the displaying is simultaneously with an emergency services telephone icon; and
the description persists during an emergency call made using the icon.

* * * * *